(12) United States Patent
Williams, Jr. et al.

(10) Patent No.: US 7,689,530 B1
(45) Date of Patent: Mar. 30, 2010

(54) DFA SEQUENTIAL MATCHING OF REGULAR EXPRESSION WITH DIVERGENT STATES

(75) Inventors: John J. Williams, Jr., Pleasanton, CA (US); Rina Panigrahy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1335 days.

(21) Appl. No.: 11/144,476

(22) Filed: Jun. 3, 2005

Related U.S. Application Data

(63) Continuation-in-part of application No. 10/340,392, filed on Jan. 10, 2003, now Pat. No. 7,308,446.

(51) Int. Cl.
 *G06F 15/18* (2006.01)
 *G06F 15/00* (2006.01)
(52) U.S. Cl. ....................................... 706/62
(58) Field of Classification Search ..................... 706/62
 See application file for complete search history.

(56) References Cited

U.S. PATENT DOCUMENTS

| | | | |
|---|---|---|---|
| 4,241,402 A | 12/1980 | Mayper, Jr. et al. | |
| 5,978,801 A * | 11/1999 | Yuasa | 707/6 |
| 6,263,333 B1 | 7/2001 | Houchin et al. | |
| 6,571,243 B2 | 5/2003 | Gupta et al. | |
| 6,892,237 B1 | 5/2005 | Gai et al. | |
| 6,952,425 B1 | 10/2005 | Nelson | |
| 2003/0051043 A1 | 3/2003 | Wyschogrod et al. | |
| 2004/0225999 A1 * | 11/2004 | Nuss | 717/114 |
| 2005/0273450 A1 * | 12/2005 | McMillen et al. | 707/1 |
| 2006/0005241 A1 * | 1/2006 | Zhao et al. | 726/22 |

OTHER PUBLICATIONS

Tripp et al., "A Finite-State-Machine based string matching system for Intrusion Detection on High-Speed Networks", 14th Annual EICAR Conference, 2005.*
Garofalakis et al. "SPIRIT: Sequential Pattern Mining with Regular Expression Constraints", VLDB, 1999.*
Albert-Lorincz et al. "A framework for frequent sequence mining under generalized regular expression constraints", KDID, 2003.*

(Continued)

*Primary Examiner*—David R Vincent
*Assistant Examiner*—Li-Wu Chang
(74) *Attorney, Agent, or Firm*—The Law Office of Kirk D. Williams

(57) ABSTRACT

Disclosed are, inter alia, methods, apparatus, data structures, computer-readable media, and mechanisms, for identifying matches to a series of regular expressions, with the series of regular expressions including a first regular expression followed by a second regular expression, which avoids the potential overlap of characters used in matching the first and second regular expressions, while allowing individual deterministic finite automata (DFAs) to be used, whether standalone or as a merged DFA, which decreases the number of states required to represent the series of regular expressions. This potential overlap of characters can be avoided by adding marking states in a merged DFA as "divergent" in order to mask (e.g., ignore) a matching of the second regular expression for the potential overlap, or by using another DFA corresponding to the second regular expression for use during this divergent period.

20 Claims, 19 Drawing Sheets

OTHER PUBLICATIONS

Ken Thompson, "Programming Techniques," ACM, vol. 11, No. 6, Jun. 1968, pp. 419-422.

Wu et al, "A Sub-Quadratic Algorithm for Approximate Regular Expression Matching," Journal of Algorithms, vol. 19, Issue 3, 1995, pp. 1-14.

M. Barrio, P. de la Fuente, and J. Vegas, A Recursive Version of the Shift Or Algorithm, Proceedings of 14th IASTED, IASTED Acta Press, 1996, páginas 15-18.

R. Baeza-Yates and G. Gonnet, A New Approach to Text Searching, Communications of the ACM, 35(10), pp. 74-82, 1992.

Robert S. Boyer and J. Strother Moore, A Fast String Searching Algorithm. Communications of the ACM, 20 (10), pp. 762-772, 1977.

Merrill E. Isenman and Dennis E. Shasha, Performance and Architectural Issues for String Matching, IEEE Transactions on Computers, vol. 39, No. 2, Feb. 1990, pp. 238 250.

Josue Kuri and Gonzalo Navarro, Fast Multipattern Search Algorithms for Intrusion Detection Proceedings of the Seventh International Symposium on String Processing and Information Retrieval (SPIRE '00), IEEE, 2000, 12 pages.

C. Jason Coit, Stuart Staniford, and Joseph McAlerney, Towards Faster String Matching for Intrusion Detection or Exceeding the Speed of Snort, Proceedings of the DARPA Information Survivability Conference and Exposition (DISCEXII '01), IEEE, 2001, 7 pages.

Peter C. Wayner, Using Content-Addressable Search Engines to Encrypt and Break DES, Computer Science Department, Cornell University, 1991, 11 pages.

U.S. Appl. No. 10/340,392, filed Jan. 10, 2003, Panigrahy et al.

U.S. Appl. No. 11/220,082, filed Sep. 5, 2005, Michaeli et al.

* cited by examiner

FIGURE 4

401 — EXPRESSION-1: $X_1*X_2*X_3*X_4$

402 — EXPRESSION-2: $Y_1*Y_2*Y_3*Y_4*Y_5$

403 — | $X_2 X_3 Y_2 Y_3 Y_4$ |   EXPRESSION MATCHING BIT VECTOR

410 — | 1 0 1 1 0 |   EXPRESSION MATCHING BIT VECTOR AT TIME T

411 — | 1 0 0 1 0 |   KEYWORD BIT VECTOR INDICATING NEWLY MATCHED KEYWORDS AT TIME T

⇩ AND

412 — | 1 0 0 1 0 |

⇩ SHIFT

413 — | 0 1 0 0 1 |

⇩ OR

414 — | 1 1 1 1 1 |   AND-SHIFT-OR RESULT

415 — | 0 0 0 0 1 |   INDICATION OF MATCHED BASE EXPRESSION $Y_1*Y_5$ AND NOT $X_1*X_4$

⇩ AND

416 — | 0 0 0 0 1 |   INDICATION OF REGULAR EXPRESSION $Y_1*Y_2*Y_3*Y_4*Y_5$ AND NOT MATCHED $X_1*X_2*X_3*X_4$

650

```
sequential merge begin
  add starting state to unexplored state list
  mark the starting state as seen
  while (there are remaining unexplored states) begin
    pop the state from the list
    add main path events to main event structure branch
    if (there is a divergent third superimposed state) begin
      add divergent path events to divergent event structure branch
    end
    for (all characters) begin
      find next superimposed states
      if ((first DFA transitioned from nonfinal to final state) AND
          (no divergent third superimposed state)) begin
        add a divergent third starting state for the second DFA
      end
      if (the state is not already marked as seen) begin
        push the state on to the unexplored states list
        mark the state as seen
      end
      record the state transition for the product DFA
    end
  end
end
```

FIGURE 6E

DFA SEQUENTIAL MATCHING OF REGULAR EXPRESSION WITH DIVERGENT STATES

CROSS-REFERENCE TO RELATED APPLICATIONS

This is a continuation-in-part of application Ser. No. 10/340,392, filed Jan. 10, 2003, now U.S. Pat. No. 7,308,446 which is hereby incorporated by reference in its entirety.

TECHNICAL FIELD

One embodiment of the invention relates to communications and computer systems, especially computers, routers, packet switching systems, and other devices; and more particularly, one embodiment relates to a sequential matching of multiple deterministic finite automata.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Regular expression matching is becoming a common operation to be performed at high speeds. For example, URLs may need to be located in Layer 7 (L7) packet headers only if they match a set of regular expressions to classify the sessions appropriately. Similarly, regular expression matching is used for intrusion detection, security screening (e.g., whether an email or other message contains certain patterns of keywords), load balancing of traffic across multiple servers, and array of many other applications.

A problem, especially for high speed applications, is the rate at which matching can be performed, as well as the space required to store the match identification data structure. A common method to match common expressions is to convert them to a deterministic finite automaton (DFA). The use of DFAs for regular expression matching which produces a set of matched regular expressions upon reaching a final state is well-known. From one perspective, a DFA is a state machine which processes each character of an input string, and upon reaching a final state, generates a list of one or matched regular expressions. The memory requirements and speed at which these DFAs may be traversed may not meet the needs of certain applications, especially some high-speed applications.

For example, if multiple regular expressions are to be simultaneously matched against, then the DFAs for the different regular expressions typically are multiplied to get a single DFA for the entire collection. However, multiplying DFAs together can generate an exponential number of states, thus making it impractical for certain applications. Individual DFAs could be simultaneously checked, however such an approach requires that the state for each DFA be updated for each character processed. For each character in the string this could mean a large number of memory accesses, one for each DFA. Alternatively, the DFAs could be multiplied together to form a combined DFA.

Traditional literature discusses nondeterministic finite automata (NFAs) and DFAs with the intent of producing a single DFA. Indeed, most approaches to the problem have involved compiling separate and disjunctive sets of regular expressions into DFAs. Here there tend to be two extremes. First, for a purely table driven approach, the largest DFAs are constructed and run in parallel. Second, a recent hardware accelerated approach is to create many smaller DFAs and run those in parallel. What these approaches share in common is that they perform the partitioning at the regular expression level. A DFA represents sets of whole and entire regular expressions. This produces the deterministic property, but also adds greatly to the resources necessary to implement such a partitioning of the problem space, either an excessive table footprint, or many processors running in parallel.

SUMMARY OF THE INVENTION

Disclosed are, inter alia, methods, apparatus, data structures, computer-readable media, and mechanisms, for identifying matches to a series of regular expressions, with the series of regular expressions including a first regular expression followed by a second regular expression, which avoids the potential overlap of characters used in matching the first and second regular expressions, while allowing individual deterministic finite automata (DFAs) to be used, whether standalone or as a merged DFA, which decreases the number of states required to represent the series of regular expressions. This potential overlap of characters can be avoided by adding marking states in a merged DFA as "divergent" in order to mask (e.g., ignore) a matching of the second regular expression for the potential overlap, or by using another DFA corresponding to the second regular expression for use during this divergent period.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 illustrates bitmaps and operations used to determine matching regular expressions in one embodiment;

FIG. 6E is a block diagram illustrating a sequential merge process used in one embodiment for producing a merged DFA with identified divergent states.

DETAILED DESCRIPTION

Figure 1A:
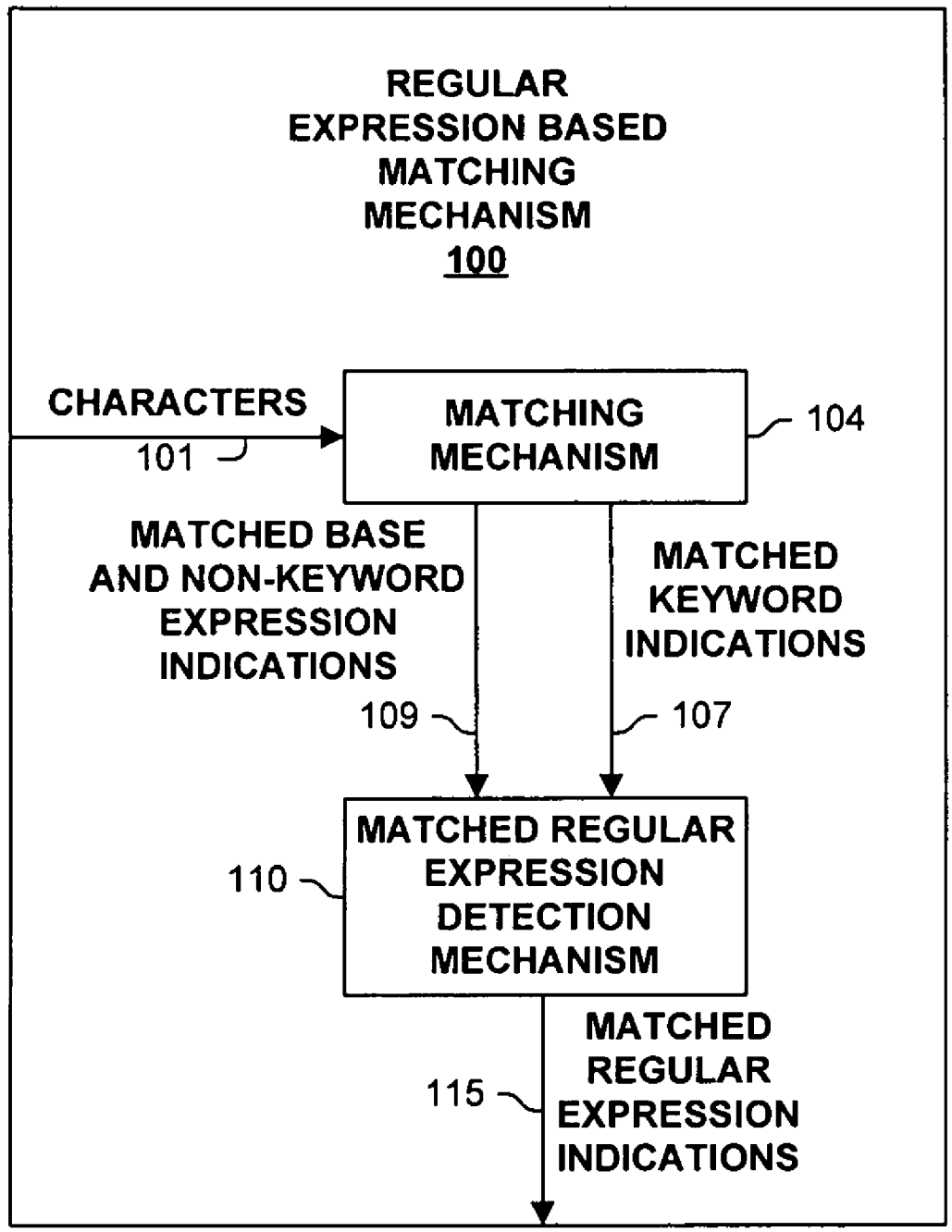
FIG. 1A is a block diagram of a regular expression matching mechanism used in one embodiment.

Disclosed are, inter alia, methods, apparatus, data structures, computer-readable media, and mechanisms, for processing and/or generating a hierarchical tree of deterministic finite automata. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to, personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Methods and apparatus are disclosed for regular expression matching, especially for, but not limited to high-speed applications such as in a packet switching system (e.g., a router). One embodiment includes a matching mechanism for processing each character of a plurality of input characters to progressively generate keyword indications of matched keywords as matched keywords are identified, and for generating one or more matching indications of matched base expressions and non-keyword expressions. These indications are received by a matched regular expression detection mechanism which generates one or more matched regular expression indications based on said one or more keyword indications and said one or more matching indications. In one embodiment, the matched regular expression detection mechanism maintains a keyword data structure, which is updated as matched keyword indications are received to ensure they are matched in a proper order. One embodiment uses a bitmap to track the matched keywords and AND-SHIFT-OR operations to efficiently update the bitmap in a manner that ensures that all previous keywords in the order defined by a regular expression are matched prior to updating the bitmap in response to one of the newly matched keywords.

One embodiment receives a collection of prioritized regular expressions as input, determines, and programs the regular expression matching system. One embodiment parses a regular expression in an attempt to decrease the number of states typically required for the state machine to be used for identifying the matched expressions. Typically, the number of states grows exponentially when the multiplied (e.g., combined) as the state machine (e.g., DFA) needs to "remember" which keywords it has seen, and these keywords can be in different positions within the string. If the number of keywords is k, the number of subsets of keywords it has seen could be $2^k$. One embodiment reduces the number of states required by a traditional DFA approach by tracking the matching of keywords.

In one embodiment, a first stage state machine (e.g., DFA) performs the regular expression matching, and progressively signals a second stage regular expression matching mechanism at each state as to any identified matching keywords. The second stage remember all the matched keywords. After the entire input string has passed through the first stage, the second stage looks at the collection of keywords along with the suffix-prefixes that are matched and outputs the highest priority regular expression that is matched. Additionally, one embodiment indicates a subset or all of the matching regular expressions.

As used herein, an expression of the form X* is called a prefix type regular expression, where X is a string consisting of one or more characters and '*' represents zero or more characters (in some contexts denoted ".*") An expression of the form *X is called a suffix type regular expression. An expression of the form $X_1 * X_n$ is called a base expression (or suffix-prefix type regular expression), which corresponds to string $X_1$ followed by zero or more characters, then followed by the keyword $X_n$.

In one embodiment, a keyword regular expression to be matched is in the form of $X_1 * X_2 * X_3 \ldots * X_n$, where each $X_i$ is a constant string and $X_2, X_3, \ldots, X_{n-1}$, are referred to as keywords, and $X_1 * X_n$ is called a base expression. In one embodiment, a string S is considered to have matched the regular expression if (a) $X_1$ is a prefix of S, (b) $X_n$ is a suffix of S, and (c) $X_2, X_3, \ldots, X_{n-1}$ occur as substrings of S with their ending points in that order. Additionally, one embodiment requires the exact, non-overlapping matching of all keywords in order for a match to be defined, by identifying expressions where the keywords and the suffix and the prefix cannot overlap with each other. Additionally, regular expressions to be matched may also contain other operations such as the '|' (Or), ?. For example, in one embodiment, regular expressions to be matched may include such operations as (a|A)*(b|B)*(c|C).

One embodiment matches keyword and non-keyword expressions, where a non-keyword expression contains no keywords. For example, a non-keyword expression could be a string that is exactly matched, a base expression, etc.

One embodiment receives a particular regular expression X*Y*Z, and identifies a corresponding base expression X*Z and suffix-type expression *Y. In one embodiment, expression *Y is matched as soon as a Y is identified in the input string and the second stage is notified about this match. Thus, in one embodiment receiving the regular expressions $X_1*Y_1*Z_1, X_2*Y_2*Z_2, \ldots$ to match, the expressions $X_1*Z_1$, $*Y_1, X_2*Z_2, *Y_2 \ldots$ are produced. Their state machines are then multiplied to get a relatively smaller single state machine, which is used in one embodiment.

Note, it is possible that such partitioning may result in an indication of a regular expression being matched according to the rules of one embodiment; however, when the regular expression is strictly construed, the actual regular expression may not have been truly matched, such might be the case when an X and Y, or Y and Z can overlap. This is perfectly fine in one embodiment, while another embodiment requiring strict matching of regular expressions may not partition overlapping portions an input regular expression, which will typically result in a larger match state machine in one embodiment when compared to another one embodiment.

Multiplying DFAs or other state machines for n regular expressions could lead to $2^n$ states. However, certain types of regular expressions do not lead to exponentially number of states when multiplied together. A product of DFAs or other state machines for n prefix type regular expressions can have at most linear number of states that is at most the sum of the lengths of each expression. The same is true about a collection of suffix type expressions. As for suffix-prefix type expressions, the number of states is at most quadratic in the size of the input, and is linear in many cases. Thus, by selectively decomposing regular expressions into prefix and suffix type expressions, it is possible to reduce the overall number of states (and eliminate the exponential explosion) when their DFAs or other state machines are multiplied together.

In one embodiment, if there are k keywords, the matched regular expression detection mechanism, a second stage element in one embodiment, maintains a bit vector of length k. (Note, the terms bitmap and bit vector are used interchangeably herein.) When a keyword is matched in a matching mechanism, a first stage element in one embodiment, one or more bits may need to be set in this bit vector as more that one keyword may be matched at a time in a particular regular expression. In one embodiment, the bits set are obtained by looking up in a matched keyword data structure typically indexed by the current state of the DFA (or other matching mechanism).

When processing of the characters of the input string is complete or a final state is reached in the matching mechanism, the matched regular expression detection mechanism receives an indication of the final state of the matching mechanism. This final state indication identifies the matched suffixes and prefixes from the regular expressions. In one embodiment, this final state indication is used to index into a final state matching data structure to identify the set of regular expressions whose suffixes and prefixes are matched. In one embodiment, this set is divided into two categories: non-keyword expressions and base expressions. In one embodiment, the matched non-keyword expressions are identified as a list in decreasing order of priority. In one embodiment, the matched base expressions are identified in a k-bit vector. ANDing this vector with the k-bit state vector gives exactly those keyword expressions that are matched. The left most one in this final vector gives the highest priority keyword expression matched. The highest priority non-keyword expression is obtained from the head of the list.

In one embodiment, the input string is fed to the matching mechanism (e.g., DFA etc.) Whenever a keyword is matched, the matching mechanism sends an indication of the matched keyword to the matched regular expression detection mechanism. In one embodiment, this indication corresponds to a state of the matching mechanism. The matched regular expression detection mechanism looks up this state in a matched keyword data structure, and sets the identified bits in one or more of the expression matching bit vectors. After the matching mechanism is finished with the string, it also sends an indication of the final state of the DFA to the matched regular expression detection mechanism, which looks up this state in a final state matching data structure to obtain a list of non-keyword regular expressions and bit vector for the matched keyword expressions. The matched regular expression detection mechanism ANDs this matched keyword bit vector with the expression matching bit vectors and finds the position of the left most set bit to identify the highest priority matching keyword expression. It compares its priority with that of the matched non-keyword expression at the head of the prioritized list and returns the one with the greater priority. In one embodiment, more than one matched expression is identified.

For example, the regular expression X*Y*Z*U requires that X and U are prefixes and suffixes of the input string, and Y and Z are present in the string with the Y occurring before the Z. It is also necessary that the occurrences of X, Y, Z and U in the input string are non-overlapping. One embodiment relaxes the definition of the regular expression, while one embodiment does not. One embodiment still requires that X, Y, Z and U occur in the input string in that order, but may overlap.

In one embodiment, the total number of keywords in the all regular expressions counting duplicates is determined. Assume that there are k of them. The matched regular expression detection mechanism maintains a k-bit vector per session for each regular expression to be matched. The keywords of any one regular expression correspond to contiguous bits in the bit vector in the order they occur in the regular expression, with different portions of the bit vector corresponding to each of the regular expressions to be matched, with their ordering from left to right in decreasing priority of regular expression.

The matching mechanism notifies the matched regular expression detection mechanism of a matched keyword by typically providing an indication of a state. The matched regular expression detection mechanism retrieves a corresponding bit vector to identify the keywords and their positions in the expression matching bit vector to be set. However, a certain bit in the expression matching keyword bit vector can only be set if the bits corresponding to the previous keywords have been set, such as to require the keywords to be matched in the order specified by the original regular expression. One embodiment accomplishes this with an AND operation, followed by a right shift operation, followed by an OR operation.

In one embodiment, the matched regular expression detection mechanism retrieves a matched keyword bit vector which has bits set for corresponding matched keywords; however, the set bits are one position left of the actual matching bit locations (which saves one shift left operation). The matched regular expression detection mechanism then ANDs this retrieved bit vector with the expression matching bit vectors; right shifts the result, and then ORs it to the expression matching bit vectors. This takes care of all the non-first keywords. As for the first keywords, the expression matching bit vectors simply ORs the expression matching bit vectors with another bit vector that has ones wherever a matched keyword is the first one in the regular expression.

In one embodiment, bit operations are performed on the bit vector, and thus it may be desirable to optimize the value of k. One fact to note is that not every key word leads to exponentiation of states. For example, in the two expressions a*b*c and d*e*f the two keywords do not lead to doubling of states. This is because their prefixes cannot be matched simultaneously. For such keywords, one embodiment does not allocate bits in the bit vector. Two prefixes can be matched simultaneously only one is a prefix of the other. This gives as a method to optimize the number of keywords remembered by the bit vector.

One can imagine a prefix tree obtained by representing all prefixes as nodes in a tree. If all the prefixes end in distinct leaf nodes in the tree then one does not need to strip out any keywords from the regular expressions and the size of the combined DFA will not be exponential. Further one can afford one regular expression per leaf node that may contain keywords. So, in one embodiment, all regular expressions with keywords are parsed except for the longest ones among those whose prefixes end in a specific leaf node.

For example, assume there are three expressions including: a*b*c, ab*c*d, and ac*e*f. It is not necessary to break these into expressions a*, *b, and *c to prevent an exponential state explosion. if one considers a tree of these expressions having node a with leaf b and leaf c, it is only necessary that a node or one of the leaves be split. Thus, one embodiment tracks prefixes a*, ab*, and ac*. Similarly, not every expression containing keywords needs to be split into keyword expressions, as two expressions multiply only if their prefixes can match simultaneously. Thus, one can consider a tree of these prefixes, and one of the keywords doesn't need to be split from each leaf.

Turning to FIG. 1A, illustrated is a block diagram of a regular expression matching mechanism 100 used in one embodiment. Characters 101 are received by matching mechanism 104, which progressively generates one or more matched keyword indications 107 as the matched keywords are identified (and for each processed character or characters, it may not generate a match indication if there was no matching keyword detected or it may generate a null match indication). Additionally, matching mechanism 104 generates one or more matching indications of matched base expressions and non-keyword expressions 109 as they are identified. Matched regular expression detection mechanism 110, generates one or more matched regular expression indications 115 based on the received indications 107 and 109.

Figure 1B:
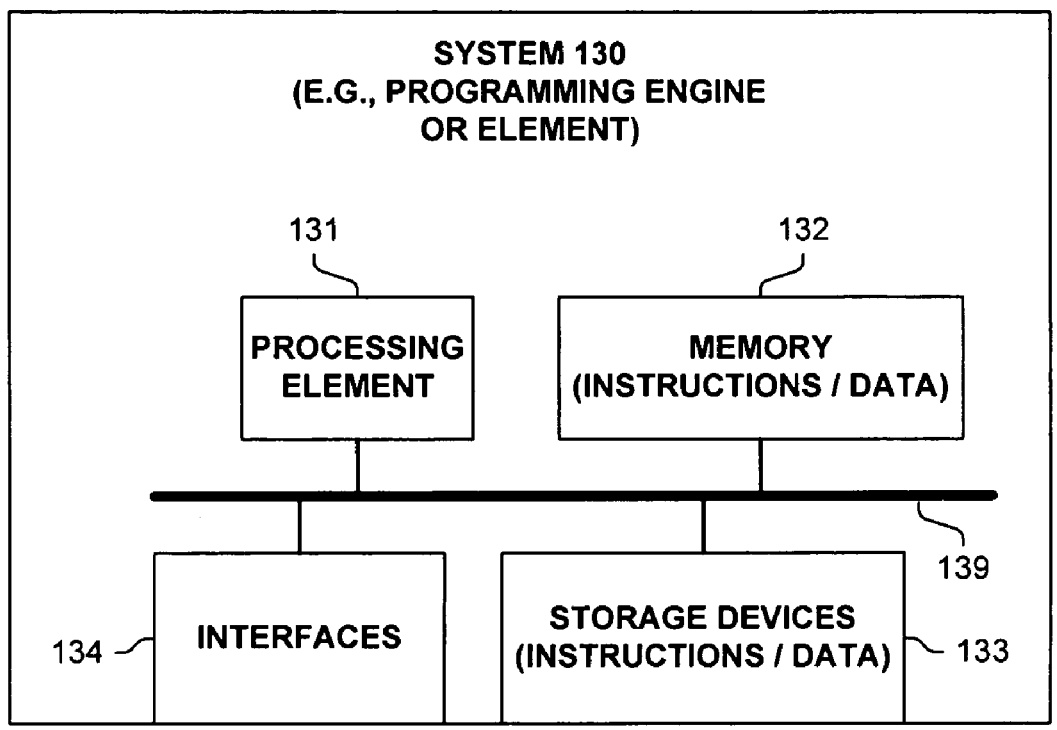
FIG. 1B is a block diagram of a programming engine used in one embodiment or a matching mechanism or element used in one embodiment.

FIG. 1B is a block diagram of system 130 (e.g., a programming engine or a matching mechanism or element) used in one embodiment. For example, in one embodiment, regular expressions to be matched are received by system 130, which partitions them into base expressions and keywords, and programs a regular expression matching mechanism, such as mechanism 100 illustrated in FIG. 1A. In one embodiment, system 130 performs one or more functions of a regular expression matching mechanism. These functions may include, inter alia, that of a matching mechanism for progressively identifying matched keywords and matched base and non-keyword expressions, and/or that of a matched regular expression detection mechanism which determines the matched regular expressions based on the receipt of such indications, and/or other functions in accordance with the invention.

In one embodiment, system 130 includes a processing element 131, memory 132, storage devices 133, and one or more interfaces 134 for communicating with other elements, other components, and/or external devices. Processing element 131, memory 132, storage devices 133, and one or more interfaces 134 are typically coupled via one or more communications mechanisms 139 (shown as a bus for illustrative purposes). Various embodiments of system 130 may include more or less elements.

The operation of system 130 is typically controlled by processing element 131 using memory 132 and storage devices 133 to perform one or more tasks or processes. Memory 132 is one type of computer-readable medium, and typically comprises random access memory (RAM), read only memory (ROM), flash memory, integrated circuits, and/or other memory components. Memory 132 typically stores computer-executable instructions to be executed by processing element 131 and/or data which is manipulated by processing element 131 for implementing functionality in accordance with the invention. Storage devices 133 are another type of computer-readable medium, and typically comprise solid state storage media, disk drives, diskettes, networked services, tape drives, and other storage devices. Storage devices 133 typically store computer-executable instructions to be executed by processing element 131 and/or data which is manipulated by processing element 131 for implementing functionality in accordance with the invention.

Figure 1C:
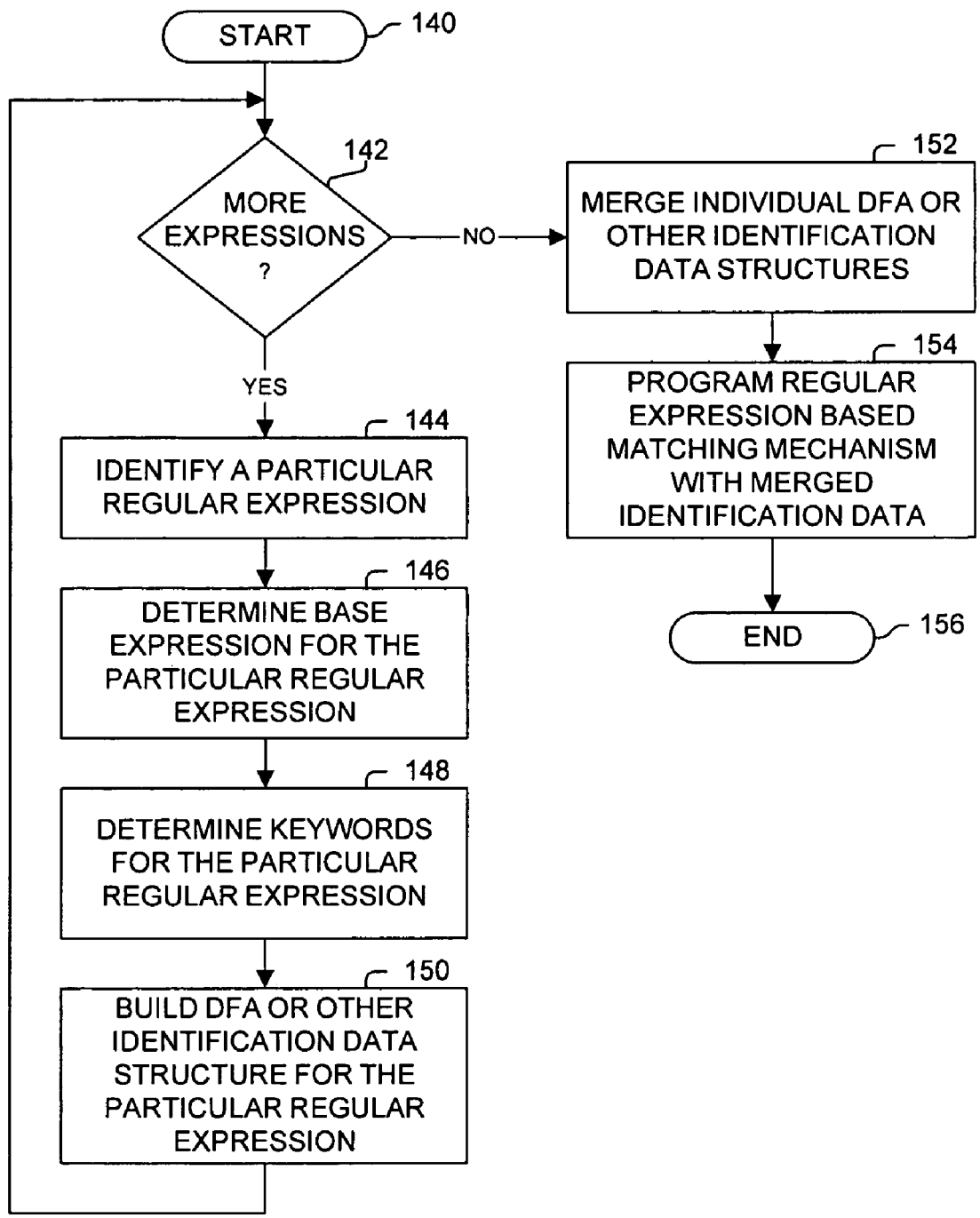
FIG. 1C is a flow diagram illustrating a process used in one embodiment for identifying one or more regular expressions to be matched and for programming a regular expression matching mechanism.

FIG. 1C is a flow diagram illustrating a process used in one embodiment for identifying one or more regular expressions to be matched and for programming a regular expression matching mechanism. Processing begins with process block 140. As determined in process block 142, if there are more expressions to be programmed, then in process block 144, a next particular regular expression is identified (e.g., received, read from memory or a data structure, etc.) Next, in process block 146, the base expression for the particular regular expression is determined; and in process block 148, the keywords corresponding to the particular regular expression are determined. In process block 150, a DFA or other identification data structure is built for the particular regular expression. Processing returns to process block 142. After the individual DFAs (or other data structures) are built for each of the regular expressions, then processing proceeds to process block 152, wherein they are multiplied or otherwise merged together, and in process block 154, the regular expression matching mechanism is programmed with the multiplied keyword and regular expression identification data structure. Processing is complete as indicated by process block 156.

Figure 2A:
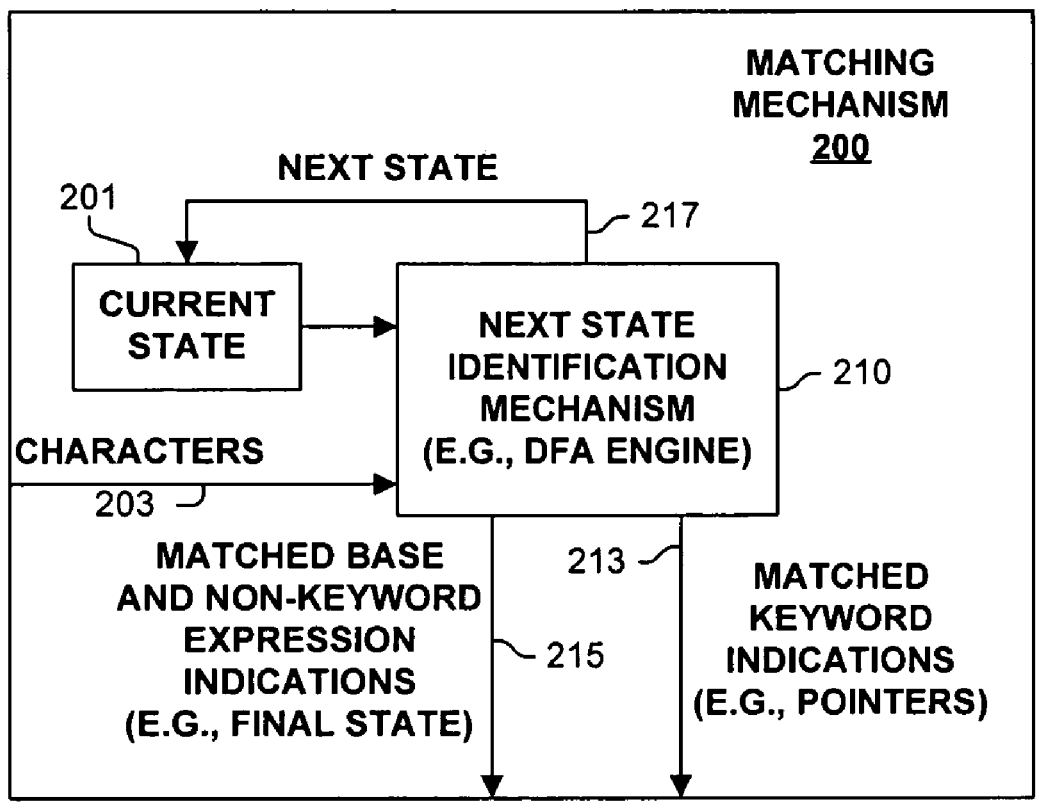
FIG. 2A is a block diagram of a matching mechanism used in one embodiment for processing each character of a plurality of input characters to progressively generate keyword indications of matched keywords as matched keywords are identified.

FIG. 2A is a block diagram of a matching mechanism 200 used in one embodiment for processing each character of a plurality of input characters 203 to progressively generate keyword indications 213 of matched keywords as matched keywords are identified, and matched based and non-keyword expression indications 215.

As shown, next state identification mechanism 210, based on current state 201 and one of the input characters 203, identifies its next state 217 (which then becomes the current state 201) and any matched keywords, matched base expressions, and matched non-keyword expressions in this next state 217, and generates corresponding indications 213 and 215 thereof. This sequence repeats for each received character of characters 203, and thus indications 213 and 215 are progressively generated. In one embodiment, next state identification mechanism 200 corresponds to a DFA engine modified to produce the progressive indications 213 and 215. In one embodiment, next state identification mechanism 200 uses a state table (e.g., state data structure) for identifying next state 217, and matched keywords, base expressions, and non-keyword expressions.

Figure 2B:
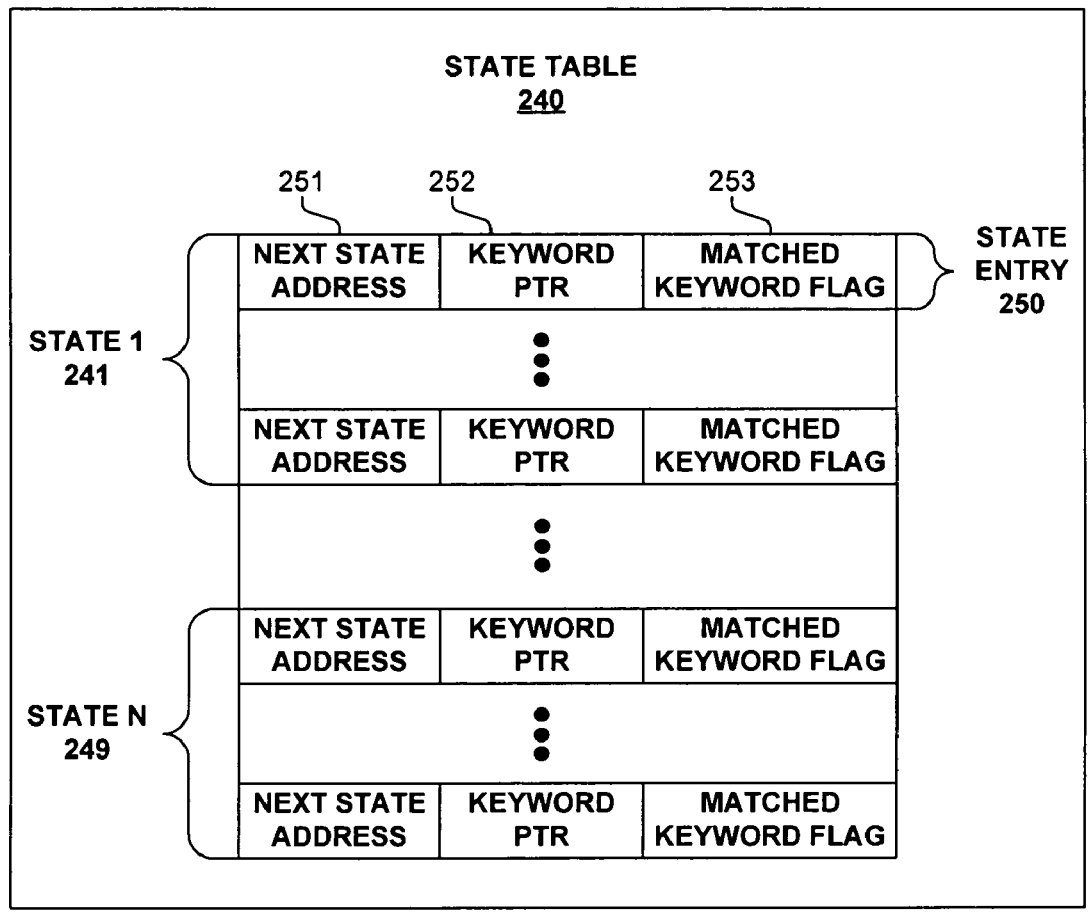
FIG. 2B is a block diagram of a state table data structure used in one embodiment.

FIG. 2B illustrates such a state table 240 used in one embodiment. As shown, a representation of each state 241-249 may include multiple state entries 250. The particular state entry 250 is determined based on a state and one an input character. For example, the state determines which grouping 241-249 of state entries 250 to reference, and the character determines which particular state entry 250 within the state or grouping. Each state entry 250 typically includes a next state address field 251 (e.g., for identifying a next state grouping 241-249), a keyword data structure pointer field 252 for identifying matched keywords, and a matched keyword flag 253 for indicating whether or not one or more keywords were matched. Note, one embodiment determines the matched base expressions and non-keyword expressions based on a value of the state itself.

Figure 2C:
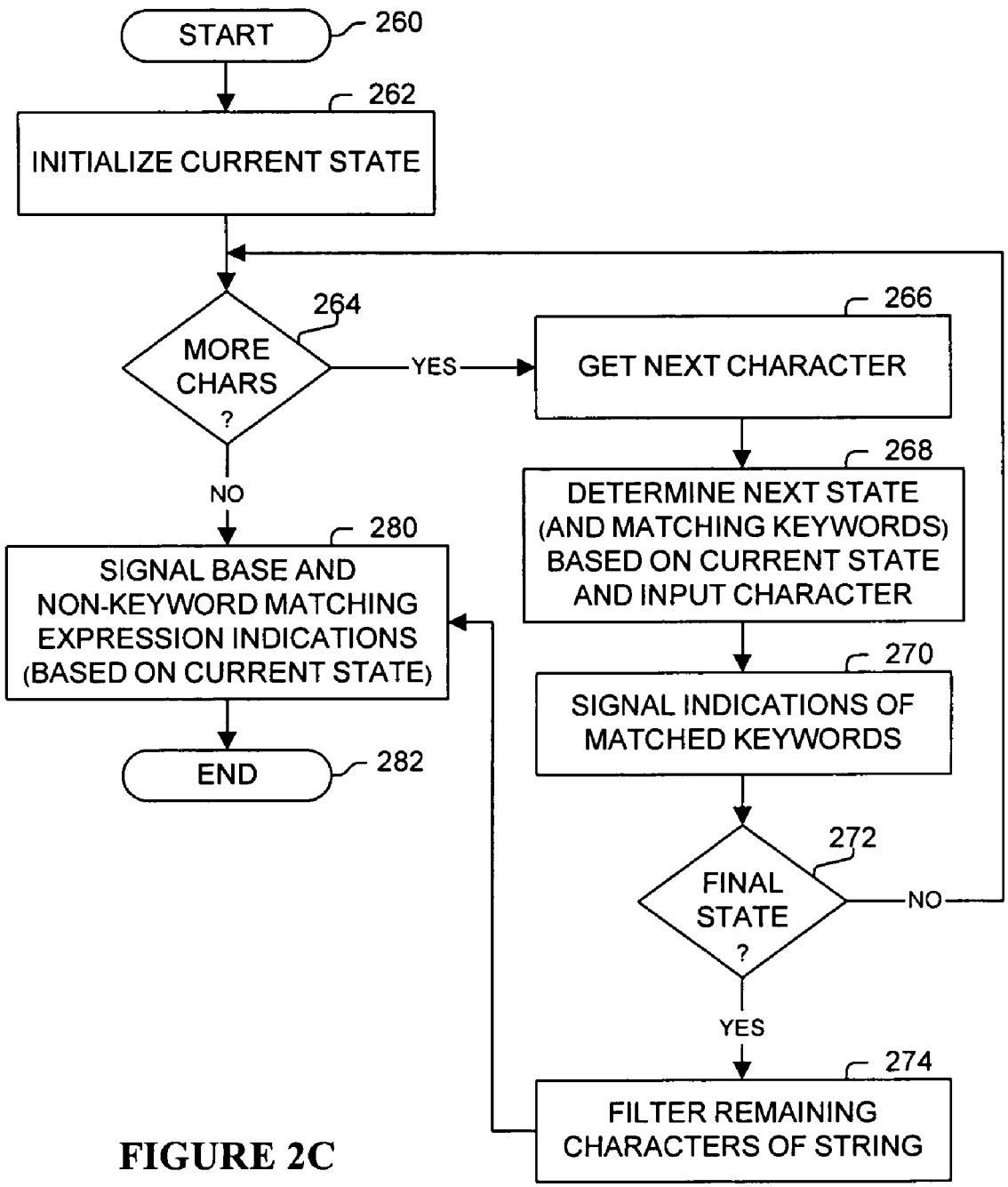
FIG. 2C is a flow diagram illustrating a process used in one embodiment of a matching mechanism.

FIG. 2C illustrates a process used in one embodiment of a matching mechanism. Processing begins with process block 260, and proceeds to process block 262, wherein the current state is initialized to a start state. As determined in process block 264, while there are more characters to process, a next character is identified (e.g., received, read from memory, etc.) in process block 266. Then, in process block 268, the next state and matching keywords (if any) are determined based on the current state and the input character. Then, in process block 270, indications of matching keywords are generated if there were any. As determined in process block 272, if the current state is not the final state, then processing returns to process block 264. Otherwise, in process block 274, any remaining characters of the string or stream of characters are filtered, and processing proceeds to process block 280. When processing reaches process block 280, indications of matching base expressions and non-keyword expressions are generated. In one embodiment, these indications may include a list of expressions or an index to a list of expressions (e.g., a value of the final state), or any other signaling mechanism. Processing is complete as indicated by process block 282.

Figure 3A:
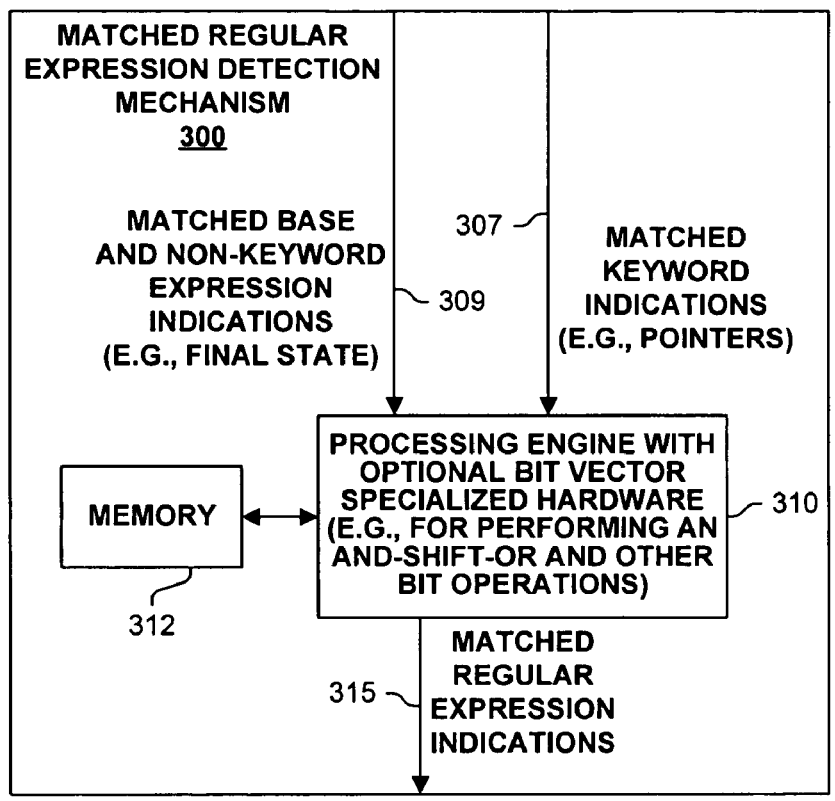
FIG. 3A is a block diagram of a matched regular expression detection mechanism used in one embodiment.

FIG. 3A illustrates a matched regular expression detection mechanism 300 used in one embodiment. As matched keyword indications 307 are progressively received, processing engine 310 (with optional bit vector specialized hardware, such as for performing an AND-SHIFT-OR operation) updates a data structure typically stored in memory 312 to maintain the matched keywords. Note, typically, a keyword is identified as being matched for a particular regular expression if it is a first keyword for the regular expression or all other preceding keywords for the particular regular expression have been previously matched. When processing engine 310 receives an indication 309 of any matched base and non-keyword expressions, processing engine 310 generates an indication 315 of a highest priority, or possibly multiple matched regular expressions. FIG. 3E illustrates one such process, but first a few data structures used in one embodiment of a matched regular expression detection mechanism 300 are illustrated.

Figure 3B:
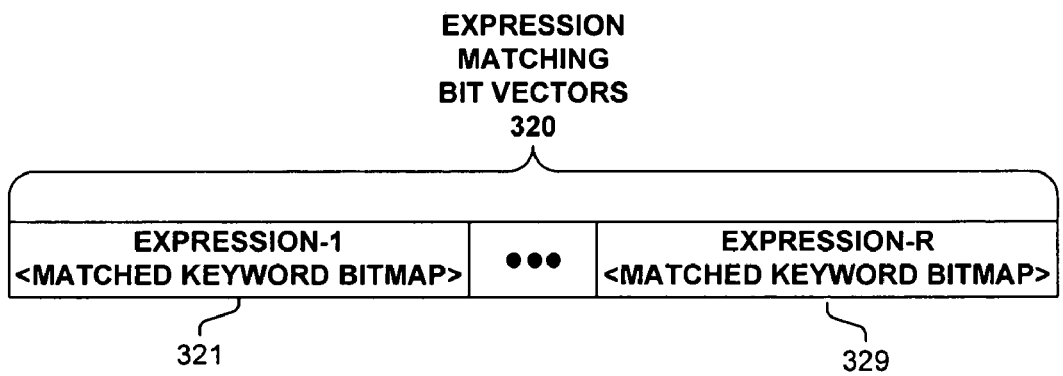
FIG. 3B is a block diagram of an expression matching bitmap data structure used in one embodiment.

FIG. 3B illustrates an expression matching bit vector data structure 320 used in one embodiment. Each regular expression to be matched has a corresponding matched keyword bitmap 321-329, which are updated as the indications of matched keywords are received. Typically, it is desirable to keep the number of keywords tracked to a small number, such as 128 to 1024, as the bit operations can be expensive, such as in the time or hardware required to perform the bit operations. Each bitmap 321-329 contains a bitmap of consecutive bits, with each bit corresponding to a keyword in its corresponding regular expression, and the ordering of the bits/keywords correspond to the order in which they must be matched by an incoming sting.

Figure 3C:
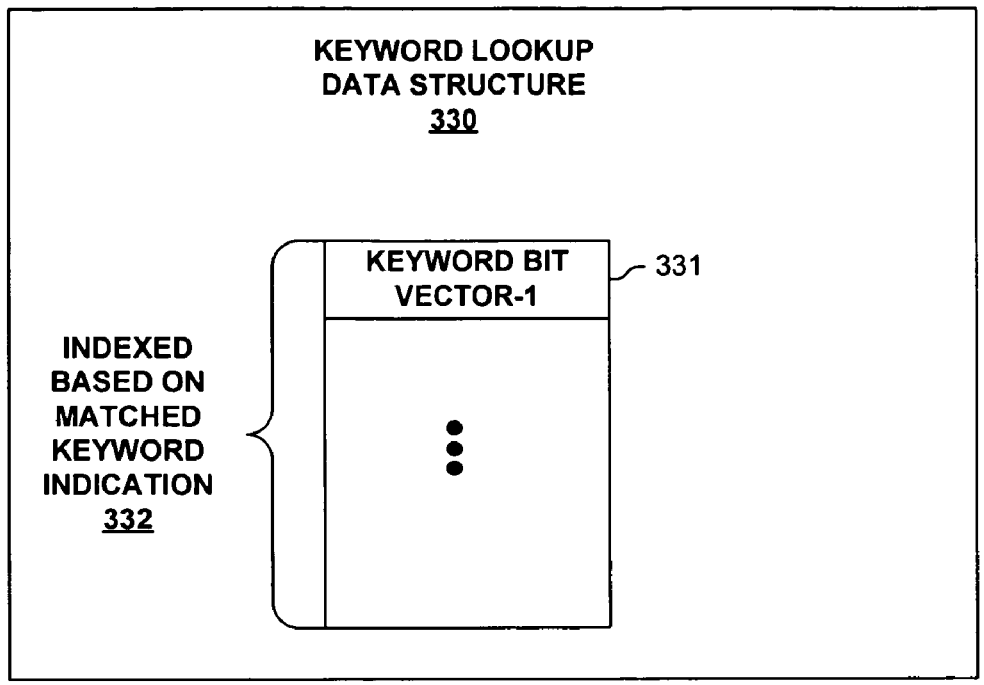
FIG. 3C is a block diagram of a matched keyword data structure used in one embodiment.

FIG. 3C illustrates a keyword lookup data structure 330 used in one embodiment. Keyword lookup data structure 330 is indexed based on a received matched keyword indication 332 to identify a keyword bit vector 331, which has bits set at positions corresponding to the matched keywords in the regular expressions. Processing engine 310 can then easily updated expression matching bit vector data structure 320 efficiently using an AND-SHIFT-OR operation, to set only those bits corresponding to matched keywords which are in a first position for a regular expression, or which has all prior keyword bits set (e.g., the previous bit being set indicates this).

Figure 3D:
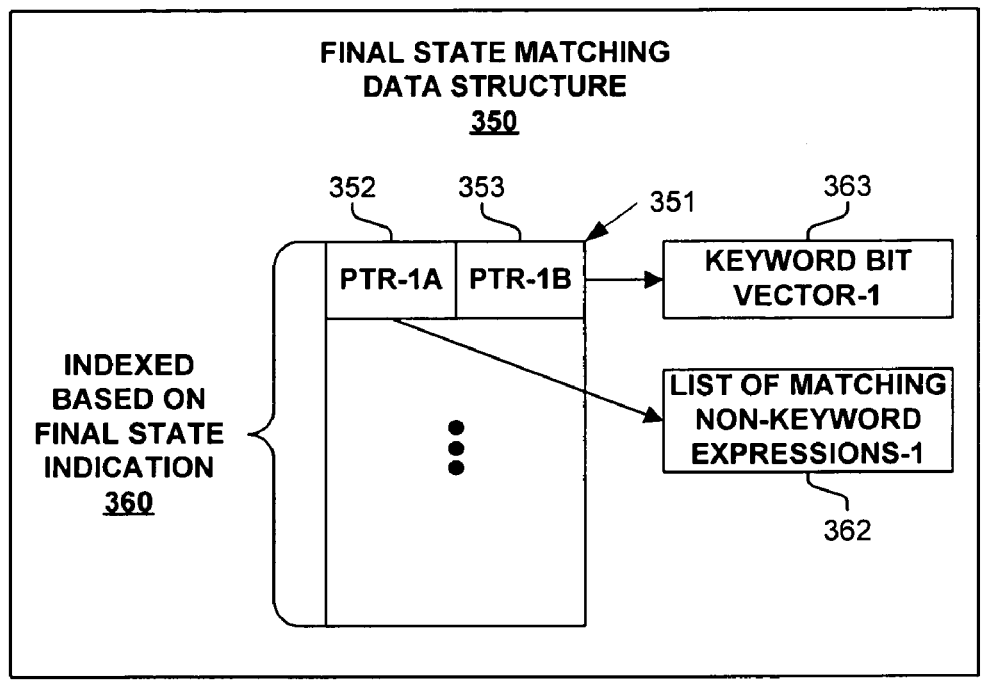
FIG. 3D is a block diagram of a final state matching data structure used in one embodiment.
Figure 3E:
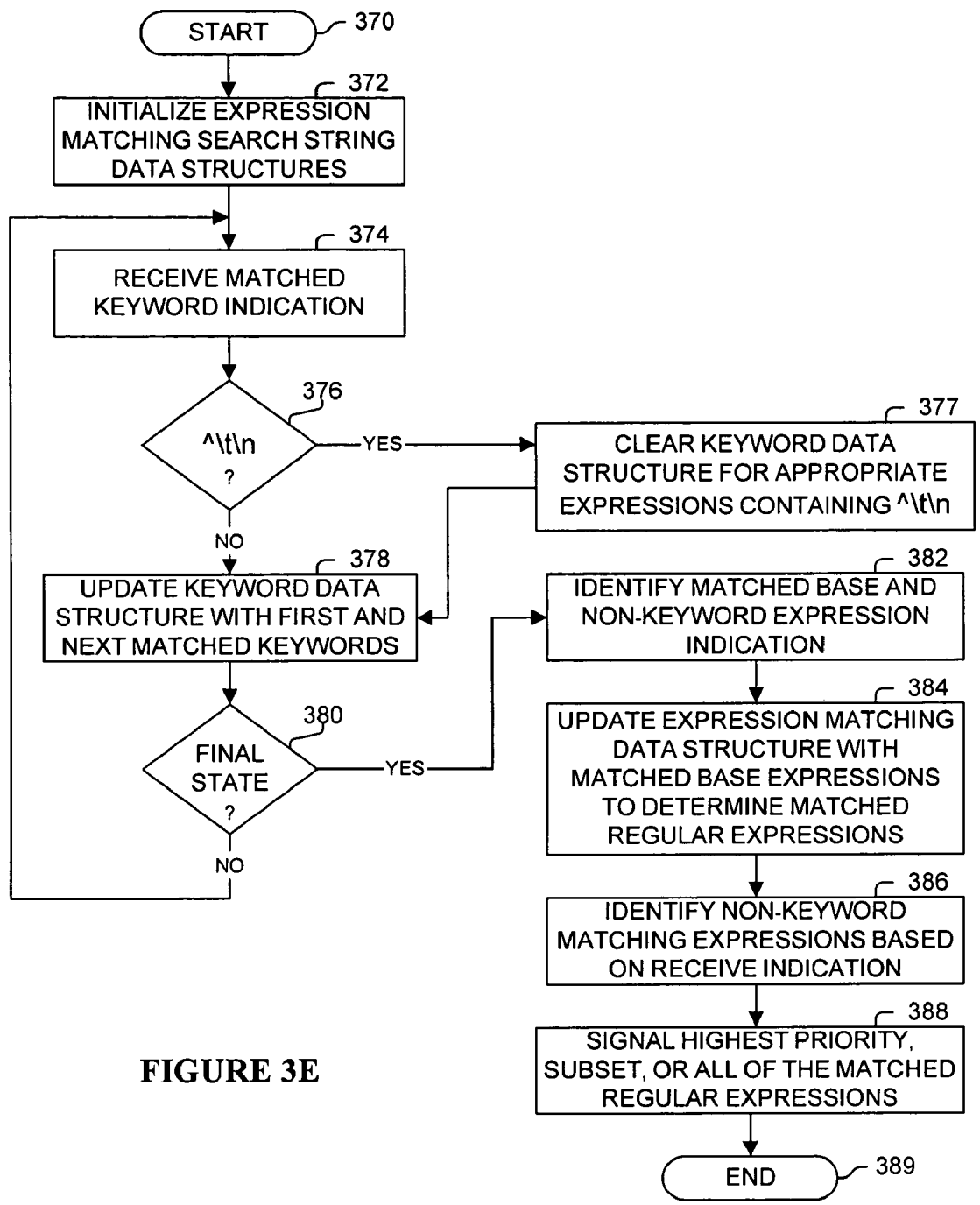
FIG. 3E is a flow diagram illustrating a process used in one embodiment for determining matched regular expressions based on received indications of matched keywords, base expressions, and non-keyword expressions.

Additionally, FIG. 3D illustrates a final state matching data structure 350 used in one embodiment. By indexing based on a final state indication 360, an entry 351 typically including two pointer fields 352 and 353 is identified. Pointer fields 352 and 353 point or otherwise indicate a keyword bit vector 363 and a list of matching non-keyword expressions 362. Expression matching bit vector data structure 320 is then updated, typically using an AND operation based on keyword bit vector 363, which, in one embodiment, has a bit set (and cleared otherwise) corresponding to the last keyword of an expression for each expression whose base expression has been matched. After the AND operation, expression matching bit vector data structure 320 then indicates the matching regular expressions, i.e., those being the expressions whose corresponding bit for the last keyword of an expression in matched keyword bitmap 321-329 is set (or those expressions that has all bits set.) In one embodiment, based on the bitmap updating mechanism used which only allows a bit to be set if all proceeding bits (if any) are previously set, then only the last bit of a matched keyword bitmap 321-329 needs to be checked to determine if the corresponding regular expression has been matched. In one embodiment, indications of all matching regular expressions are generated; while in one embodiment, an indication of only the highest priority matching keyword or non-keyword regular expression is generated.

FIG. 3E illustrates a process used in one embodiment of a mechanism for determining matched regular expressions based on progressively received indications of matched keywords. Processing begins with process block 370, and proceeds to process block 372, wherein the data structures used in determining whether or not a particular regular expression has been matched are initialized. Next, in process block 374, an indication of matched keywords is received.

One embodiment provides a mechanism to reset the keyword data structure for expressions indicating such upon receipt of a TAB-NEW LINE sequence as this sequence is typically used to delineate commands which must be in the same line, sentences, or other sequences of text or other strings on which matching operations are typically performed. In one embodiment, this reset feature is indicated using "[^\t\n]". Note, the notation '*' has been previously used herein to denote matching zero or more characters. One embodiment uses the notation "'.*" to denote matching zero or more characters (i.e., '.' indicates to match one character and '*' indicates to perform the previous part of the expression zero or more times.) Thus, in their respective contexts, the expressions a*b and a.*b are equivalent expressions. In one embodiment, the notation "[^\t\n]" is used to indicate matching anything except \t\n ('^' is used in this context to denote the not operation). Thus, a regular expression defined as a[^\t\n]*b\[^\t\n]*c indicates to match the base expression a*c with keyword b identified as being all on the same line.

Thus, as determined in process block 376, if the expression TAB-NEW LINE is identified, then in process block 377, the keyword data structure is cleared for those regular expressions (or portions thereof) which require some matching of its keywords on the same line (e.g., before receiving \t\n).

Next, in process block 378 the keyword data structure is updated with first and next matched keywords (e.g., only for those keywords with all proceeding keywords, if any, previously matched) as required for identified keywords. Note, every identified keyword will not cause the keyword data structure to be updated. Next, as determined in process block 380, if a final state has not been reached, then processing returns to process block 374.

Otherwise, in process block 382, the indication of the matched base and non-keyword expressions is identified. In process block 384, the expression matching data structure is updated based on the matched base expressions to determine the matched regular expressions. In process block 386, the matching non-keyword expressions are identified. Finally, in process block 388, the highest priority, or another subset (including possibly all) of the matching keyword and/or non-keyword expressions are signaled or identified. Processing is complete as indicated by process block 389.

FIG. 4 illustrates an example of the bitmaps and bit operations used in one embodiment to identify whether one or more regular expressions are matched. This example assumes there are two regular expressions 401 and 402 to be matched. Regular expression 401 is $X_1*X_2*X_3*X_4$ and regular expression 402 is $Y_1*Y_2*Y_3*Y_4*Y_5$. Thus, these two expressions 401 and 402 contain base expressions $X_1*X_4$ and $Y_1*Y_5$, and keyword expressions $X_2, X_3, Y_2, Y_3$, and $Y_4$. The corresponding expression matching bit vector 403 is illustrated which contains a single bit for each of the five keyword expressions, with consecutive bits assigned in the order they must be matched for each of the two expressions 401 and 402.

Assume the expression matching bitmap at time T (410) is 10110, which indicates that keywords $X_2, Y_2$, and $Y_3$ have been previously matched in the proper order within each of the two expressions 401 and 402. Also, assume keyword bitmap indicating newly matched keywords at time T (411) is generated. Note, to save a left shift operation, the set bits correspond to matching keywords offset by one bit to the right. Thus, keyword bitmap indicating newly matched keywords at time T (411) indicates that keywords $X_3$ and $Y_4$ have been just matched. (One embodiment performs this extra shift operation.) Bitmaps 410 and 411 are AND'ed to produce bitmap 412, which is shifted to the right one position to produce bitmap 413 (of course other embodiment might produce another shift resultant bitmap such as set bits being shifted in, etc.) Bitmap 413 is then OR'ed to bitmap 410 to produce the AND-SHIFT-OR result 414. The AND operation with the bitmap offset by one position leaves only bits set for the newly matched keywords whose previous bit is set (i.e., keyword is matched). Thus, the AND-SHIFT-OR operation provides an efficient mechanism to identify the keywords that are matched in the proper sequence.

Next, assume that indication of matched base expressions bit vector 415 is received which indicates by the set bit in the last keyword position corresponding to expression-2 402, that base expression $Y_1*Y_5$ of expression-2 402 was matched, and also indicates by the clear bit in the last keyword position corresponding to expression-1 401, that base expression $X_1*X_4$ was not matched. Bit vectors 414 and 415 are then AND'ed to produce bit vector 416 which indicates by the set bit in the last keyword position keyword position corresponding to expression-2 402, that expression-2 402 was matched, and by the clear bit in the last keyword position keyword position corresponding to expression-1 401, that expression-1 401 was not matched.

The teachings described supra may also be applied for use in a generalized approach for identifying matches to a series of regular expressions, with the series of regular expressions including a first regular expression followed by a second regular expression, which avoids the potential overlap of characters used in matching the first and second regular expressions, while allowing individual DFAs to be used, whether standalone or as a merged DFA, which decreases the number of states required to represent the series of regular expressions. In one embodiment, a bitmap, such as that previously described herein and possibly with a single bit per regular expression, is used to identify that the regular expressions have been matched and in the proper order. Note, although two regular expressions are typically described, the teachings herein are applicable to any number of sequential regular expressions with teachings recursively applied.

A technique used in one embodiment is to prevent the second DFA from being matched until a number of additional input characters are processed, such that it is impossible for the same characters to be used in matching the first and second regular expression.

Another technique used in one embodiment, includes traversing, based on a series of characters, a first DFA corresponding to the first regular expression for identifying a match between the first regular expression and the series of characters and a second DFA corresponding to the second regular expression for identifying one or more matches between the second regular expression and the series of characters. These DFA's may be standalone or merged to form a merged DFA. A third DFA corresponding to a divergent portion of the second regular expression is traversed based on characters in the string of characters subsequent to the first-time match of the first regular expression for identifying a match between the second regular expression and the string of characters subsequent to the first-time match of the first regular expression. The term "divergent" is used because the second and third DFAs are representing the same regular expression, but they have different states. For example, the third DFA is used to prevent/mask a match of the second regular expression by the second DFA until there is no possibility of that same characters of the series of characters were used for matching the first and second regular expressions as identified by the second DFA, then the third DFA can stop being traversed or its results be ignored, while the results of the second DFA are then used.

Thus, prior to the matching of the first regular expression, there is no possible matching of the second regular expression and any such match identified by the second DFA is masked (e.g., ignored). In response to the first-time matching of the first regular expression as identified by the first DFA, the third DFA is traversed from its starting state until it identifies that the second regular expression has been matched, or that it exits, and then the matching of the second regular expression is identified by the second DFA.

Another technique used in one embodiment, includes traversing, based on a series of characters, a merged DFA created based on a first DFA corresponding to the first regular expression for identifying a match between the first regular expression and the series of characters and a second DFA corresponding to the second regular expression for identifying one or more matches between the second regular expression and the series of characters. A set of states corresponding to the second DFA are marked as "divergent" while the rest are convergent states. The divergent states form one or more traversable paths from the final state of the first regular expression to one or more final states of the second regular expression, in order to identify mask a match of the second regular expression by the second DFA which relied on characters used in producing the match of the first regular expression. If a divergent final state is reached signifying the matching of the second regular expression, this match is masked as it relied on characters used in matching the first regular expression. However, once the traversal of the second DFA reaches a convergent state, the distinction between divergent and convergent states are ignored, and reaching of any final state of the second DFA will appropriate identify that the second regular expression was matched.

One embodiment is used for traversing a DFA for identifying matches to a series of regular expressions, with the series of regular expressions including a first regular expression followed by a second regular expression, the DFA representing the first regular expressions and the second regular expression, the DFA including multiple convergent states and multiple divergent states, the divergent states including one or more divergent states forming one or more traversable paths from a particular state corresponding to a first regular expression final state representing the matching of the first regular expression, to a divergent final state, representing the matching of the second regular expression. One embodiment includes means for traversing the DFA in response to an input string, the DFA configured to identify individual matching of the first regular expression and the second regular expression, and for masking the identification of matching the second regular expression if a particular state corresponding to the matching of the second regular expression is a divergent final state and the traversal from the state corresponding to the first-time matching of the first regular expression to the particular state includes only divergent states. One embodiment also includes means for creating the DFA, the means for creating the DFA including means for identifying states of the DFA as being convergent and divergent.

One embodiment is used for identifying matches to a series of regular expressions, with the series of regular expressions including a first regular expression followed by a second regular expression creates a first deterministic finite automaton (DFA) for the first regular expression and a second DFA for the second regular expression. The first DFA and the second DFA are merged to create a merged DFA with a particular state within the merged DFA corresponding to both a starting state of the second DFA and to a final state of the first DFA, the merged DFA including multiple convergent states and multiple divergent states, the divergent states including one or more divergent states forming one or more traversable paths from the particular state to a particular final state of the second DFA. A distinction between convergent and divergent states provides at least a mechanism for use in identifying whether or not a particular traversal of the merged DFA from the first time reaching the particular state to the particular final state should or should not correspond to a matching of the second regular expression, wherein the particular traversal reaching the particular final state results in a matching of the second regular expression if the particular traversal includes at least one convergent state, else the particular traversal reaching the particular final state does not result in a matching of the second regular expression.

One embodiment includes traversing the merged DFA to reach the particular final state, and in response, identifying that the series of regular expressions is matched. One embodiment includes traversing the merged DFA to reach the particular final state via only divergent states since reaching for the first time the particular state. One embodiment includes traversing the merged DFA to reach the particular final state again after having traversed the merged DFA to reach the particular final state via only divergent states since reaching for the first time the particular state, and in response, identifying that the series of regular expressions is matched. One embodiment includes one or more computer-readable media for performing these operations. One embodiment includes a mechanism for performing these operations. One embodiment includes means for performing each of these operations.

One embodiment is used for identifying matches to a series of regular expressions, with the series of regular expressions including a first regular expression followed by a second regular expression creates a first deterministic finite automaton (DFA) for the first regular expression and a second DFA for the second regular expression. A first deterministic finite automaton (DFA) corresponding to the first regular expression is traversed based on a series of characters for identifying a match between the first regular expression and the series of characters, and a second DFA corresponding to the second regular expression is also traversed based on these series of characters for identifying one or more matches between the second regular expression and the series of characters. A third DFA corresponding to a divergent portion of the second regular expression is traversed based on characters in the string of characters subsequent to the first-time match of the first regular expression for identifying a match between the second regular expression and the string of characters subsequent to the first-time match of the first regular expression. The matching of the second regular expression for identifying whether the series of regular expression is matched determined by the third DFA identifying the match between the second regular expression and the string of characters subsequent to the first-time match of the first regular expression, or if the third DFA is no longer relevant for identifying the matching of the second regular expression, in response to the second DFA identifying a match between the second regular expression and the series of characters.

In one embodiment, a bitmap representing an ordered matching of the first and second regular expression is updated in response to the first DFA first-time identifying the match between the first regular expression and the series of characters; and for characters of the string of characters subsequent to said first-time identification of the matching between the first regular expression and the series of characters, the bitmap representing the ordered matching of the first and second regular expression is updated in response to the third DFA identifying the match between the second regular expression and the string of characters subsequent to the first-time match of the first regular expression or if the third DFA is no longer relevant for identifying the matching of the second regular expression, in response to the second DFA identifying a match between the second regular expression and the series of characters. One embodiment includes masking the identification of a first-time matching between the second regular expression and the series of characters by the second DFA such that the second regular expression is not considered matched. Various embodiments may merge two or more of the DFAs wherein traversing the merged DFA corresponds to traversing the individual DFAs. For example, in one embodiment, the first DFA and the second DFA are merged into a merged first and second DFA, and wherein traversing the first and second DFAs is accomplished by traversing the merged first and second DFA. One embodiment includes one or more computer-readable media for performing these operations. One embodiment includes a mechanism for performing these operations. One embodiment includes means for performing each of these operations.

One embodiment is used for identifying matches to a series of regular expressions, with the series of regular expressions including a first regular expression followed by a second regular expression creates a first deterministic finite automaton (DFA) for the first regular expression and a second DFA for the second regular expression. A first deterministic finite automaton (DFA) corresponding to the first regular expression is traversed based on a series of characters, and in response to the identification of a match between the first regular expression and the series of characters, an indication of the matching first regular expression match is generated. A second DFA corresponding to the second regular expression is traversed based on this series of characters, and in response to each identification of a match between the second regular expression and the series of characters, a second DFA indication of the matching second regular expression match is generated. A third DFA corresponding to a divergent portion of the second regular expression is traversed based on characters in the string of characters subsequent to the first-time match of the first regular expression, and a third DFA indication of the matching second regular expression match or an exit signal is generated. A selection is made between the second DFA indication or the third DFA indication to determine whether the second regular expression has been match subsequent to the matching of the first regular expression.

One embodiment includes masking the identification of a first-time matching between the second regular expression and the series of characters by the second DFA such that the second regular expression is not considered matched. Various embodiments may merge two or more of the DFAs wherein traversing the merged DFA corresponds to traversing the individual DFAs. For example, in one embodiment, the first DFA and the second DFA are merged into a merged first and second DFA, and wherein traversing the first and second DFAs is accomplished by traversing the merged first and second DFA. One embodiment includes one or more computer-readable media for performing these operations. One embodiment includes a mechanism for performing these operations. One embodiment includes means for performing each of these operations.

Figure 5:
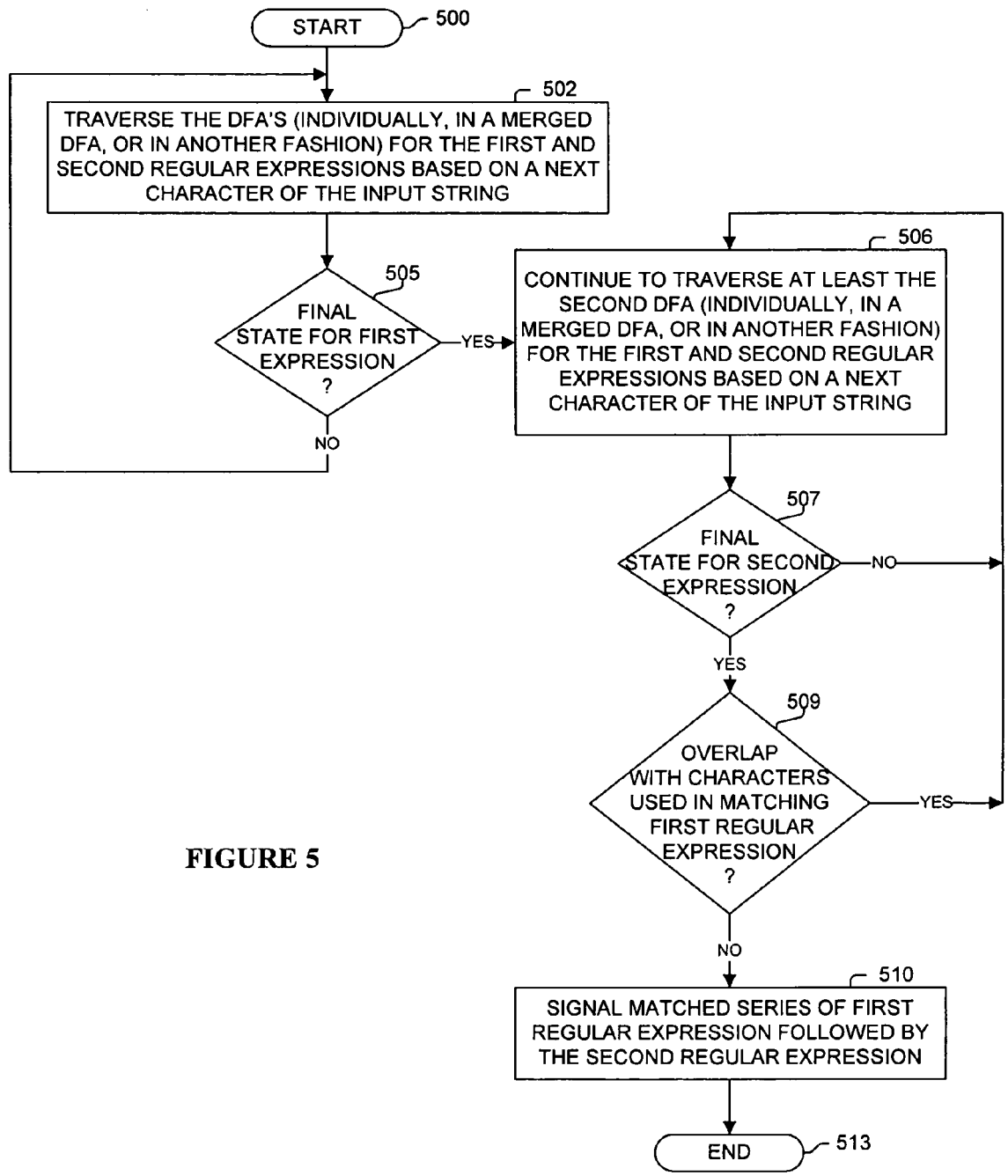
FIG. 5 is a flow diagram illustrating a process used in one embodiment of a matching mechanism.

FIG. 5 is a flow diagram illustrating a process used in one embodiment for identifying matches to a series of regular expressions, with the series of regular expressions including a first regular expression followed by a second regular expression. Processing begins with process block 500, and proceeds to process block 502, wherein a the first and second DFA's are traversed (individually, in a merged DFA, or via some other fashion) based on a next character of the input string of series of characters. As determined in process block 505, if a final state for the first DFA (e.g., the first expression has been matched) has not been reached, then processing returns to process block 502. Otherwise, in process block 506, at least the second DFA continues to be traversed for a next character of the input string. As determined in process block 507, if a final state for the second DFA (e.g., the second expression has been matched) has not been reached, then processing returns to process block 506. Otherwise, as determined in process block 509, if there was an overlap of characters used in matching the first and second regular expressions in the series of regular expressions, then processing returns to process block 506. Otherwise, as indicated by process block 510, the series of regular expressions including the first regular expression followed by the second regular expression has been matched, and is so indicated. Processing is complete as indicated by process block 511.

FIGS. 6A-D are block diagrams illustrating an example of the generation and traversal of a merged DFA including divergent and convergent states. Of course, more complex regular expressions than those used for illustrative purposes can be processed by one embodiment.

Figure 6A:
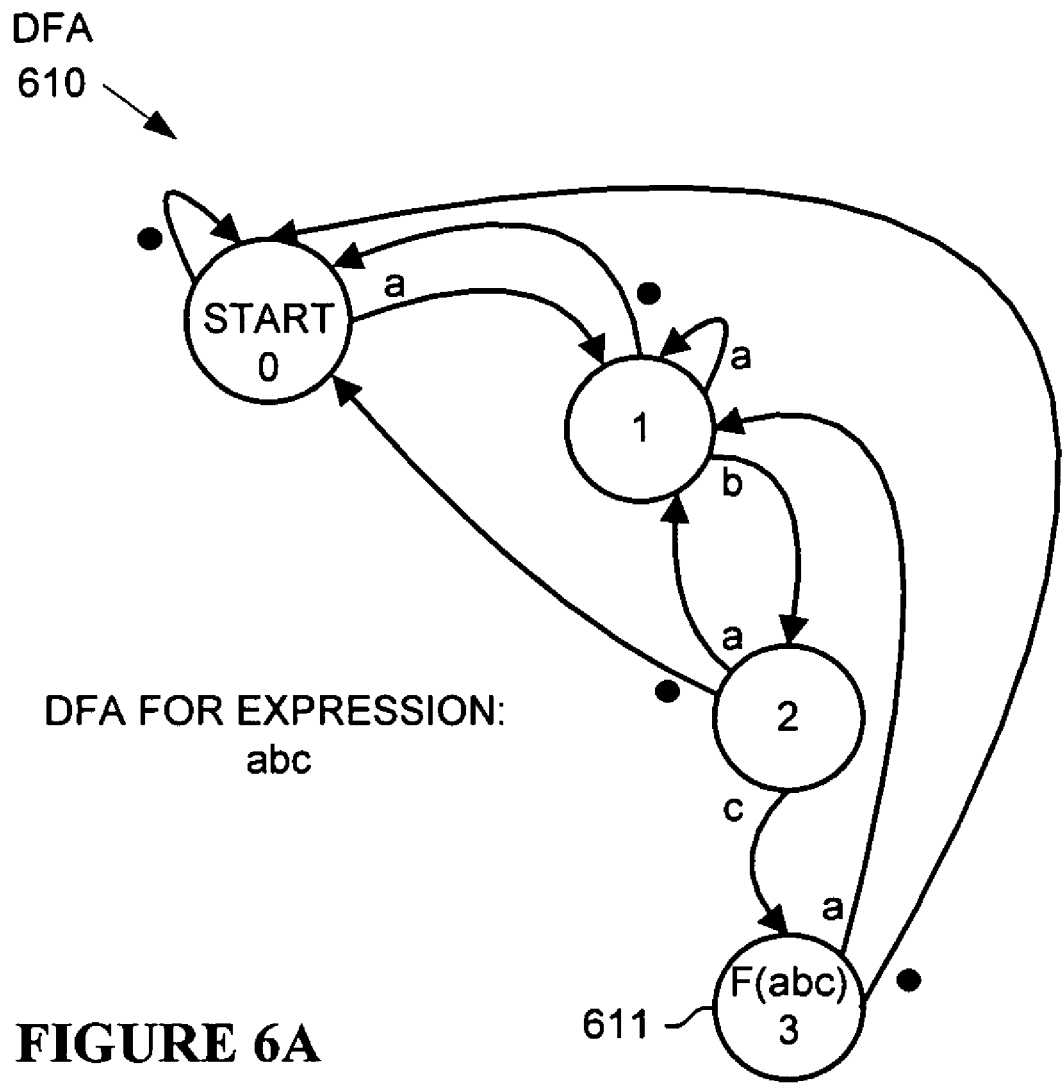
FIGS. 6A-D are block diagrams illustrating an example of the generation and traversal of a merged DFA including divergent and convergent states.

FIG. 6A illustrates an example DFA 610 corresponding to a first regular expression: "abc", with final state 621 indicating a match of this regular expression.

Figure 6B:
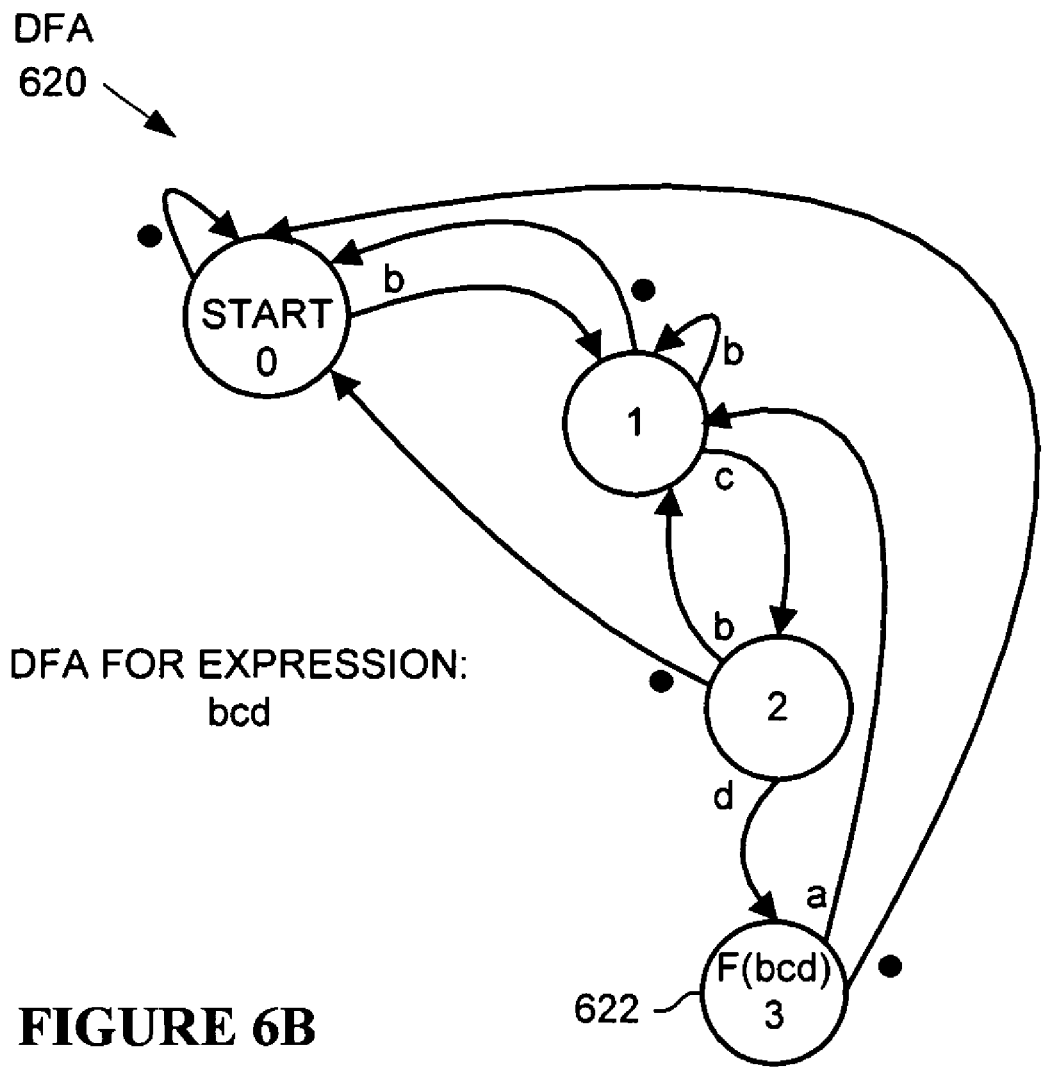

FIG. 6B illustrates an example DFA 620 corresponding to a second regular expression: "bcd", with final state 622 indicating a match of this regular expression.

Figure 6C:
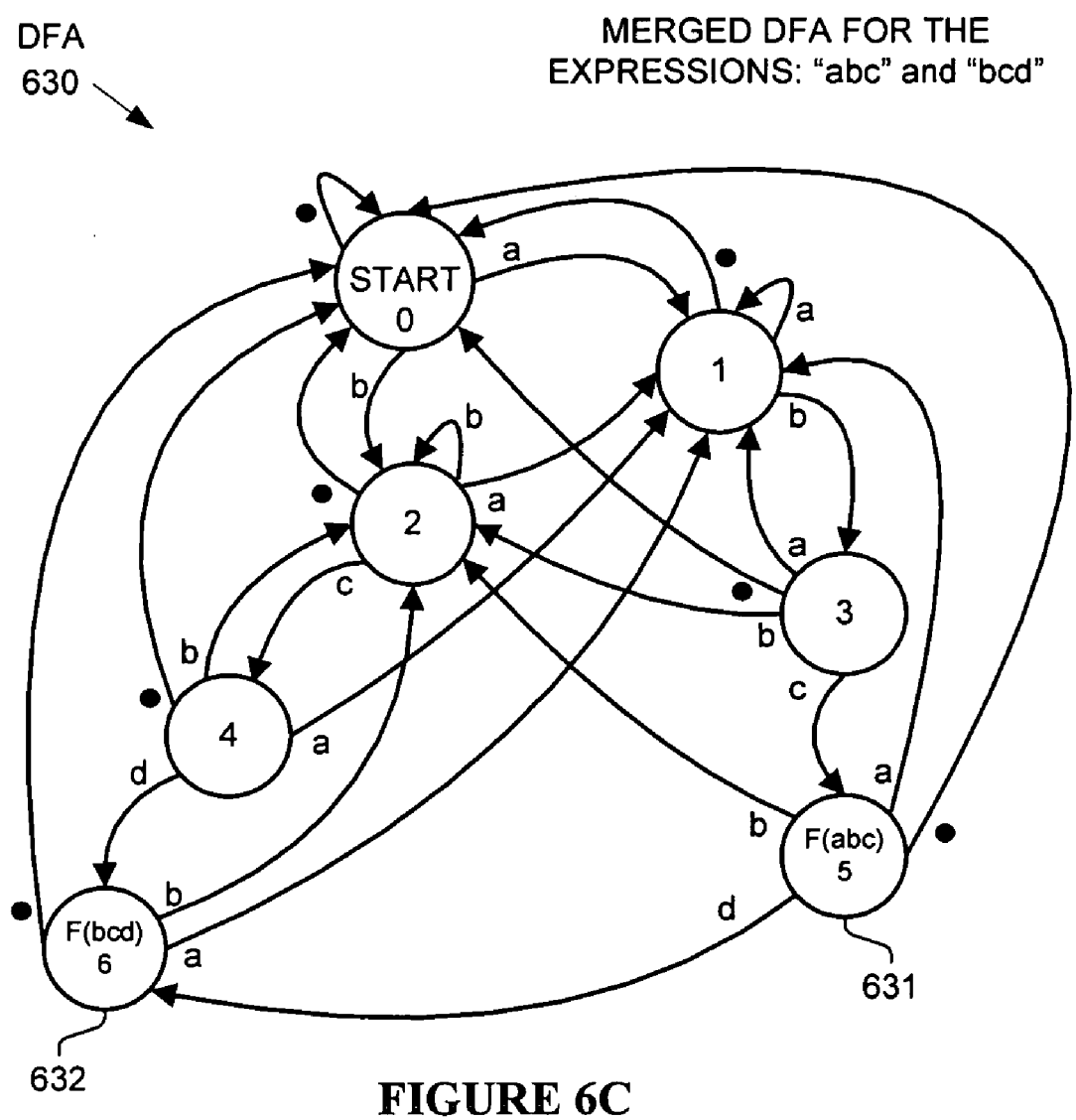

FIG. 6C illustrates a merged DFA 630 for the regular expressions "abc" and "bcd", with final state 631 corresponding to a match of the first regular expression "abc", and final state 632 corresponding to a match of the second regular expression "bcd". Note, if the string "abcd" is processed by merged DFA 630, a match of both the first and second regular expressions would be indicated, which is not the desired result of matching the first regular expression followed by matching the second regular expression.

Figure 6D:
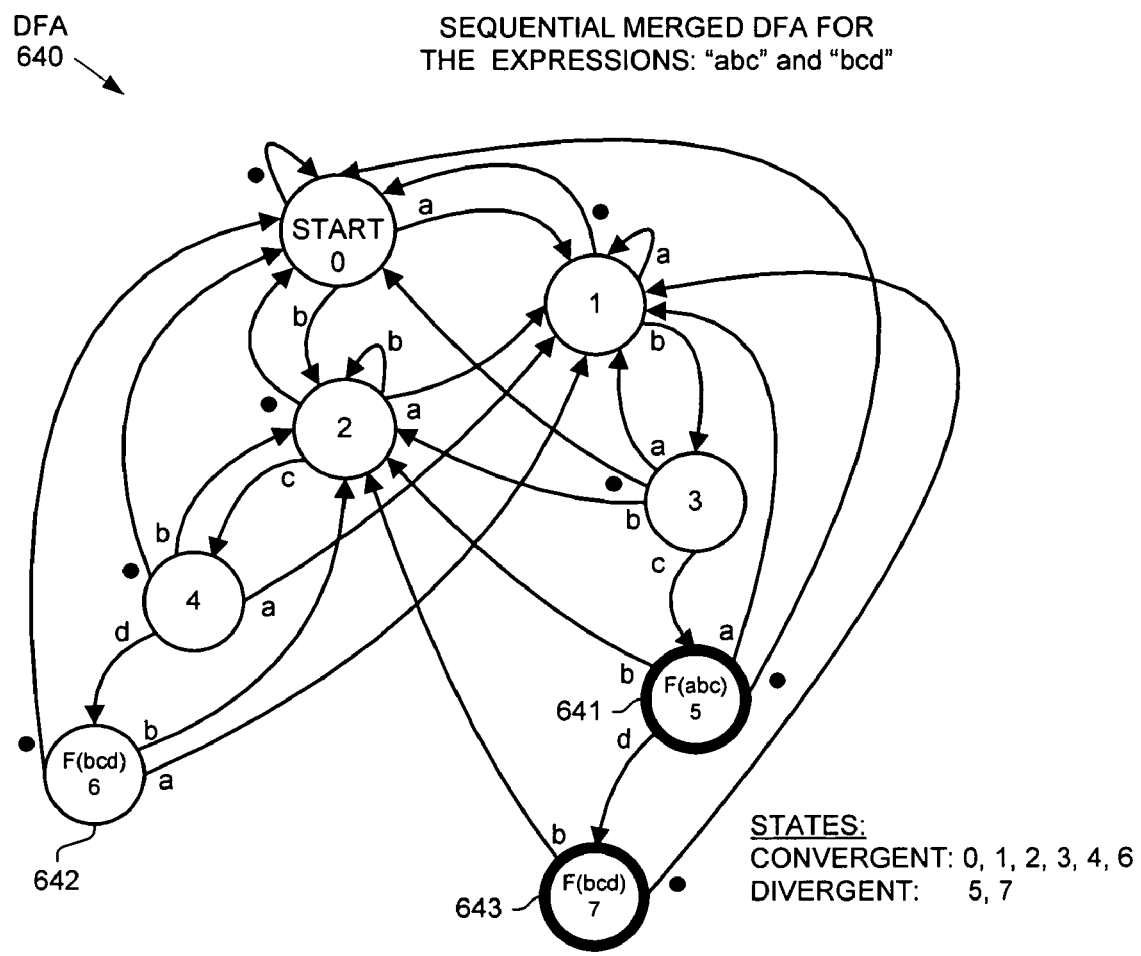

FIG. 6D illustrates a merged DFA 640 for the regular expressions "abc" and "bcd", with divergent states added to mask/avoid the matching of the second regular expression with characters used in matching the first regular expression. Final state 641 corresponds to the matching of the first regular expression "abc", and final states 642 and 643 correspond to the matching of the second regular expression "bcd". Note, states five and seven (641 and 643) are marked as divergent states to indicate that any final state corresponding to the second regular expression traversed from the first-time matching of the first regular expression will be masked (i.e., not considered as matching the second regular expression) until at least one convergent state is traversed, thus guaranteeing that overlapping characters were used in matching the first and second regular expressions. Thus, traversing DFA 640 for the string "abcd" will traverse states 0, 1, 3, 5 (indicating a match to the first regular expression), to state 7 (643), which is a divergent final state and thus is ignored because no convergent states were traversed since the first-time matching of the first regular expression. However, traversing DFA 640 for the string "abcdabcd" will traverse states 0, 1, 3, 5 (indicating a match to the first regular expression), 7 (masked divergent final state), 1 (first convergent state traversed so any final state corresponding to the second regular expression will result in its match), 3, 5, to state 7 (643), which is a divergent final state but since a convergent state was traversed since the first-time matching of the first regular expression, the second regular expression has been matched.

FIG. 6E is a block diagram illustrating a sequential merge process 650 used in one embodiment for producing a merged DFA with identified divergent states. The sequential merge operation is very similar to a standard merge operation already common practice, except that it superimposes additional starting state(s) for the second regular expression once the final state for the first regular expression is reached. If there exists the possibility of overlap between the two expressions, then the superimposed states for the second expression will not match. The state space is explored in the same way as the merge, except that whenever the superimposed states for the second DFA match, they are collapsed (this works in a similar way to setting bits in a bitmap where every state is represented as a bit), and whenever the state for the first DFA transitions from a non-final state to a final state and the second DFA is not already present, the starting state of the second DFA is added to the set of superimposed states. There are a few interesting typically properties noted here. The number of states that can be added this way is finite. A finite set of states that are superimposed will yield a finite set of signatures, and the maximum number of states that can be superimposed from the second DFA is two. If the second superimposed state is already active, the corresponding NFA states will already be superimposed in the second DFA state. This means a signature will typically have at most three states, one from the first DFA, the second from the second DFA, and possibly a third from the superimposed starting state of the second DFA. It is likely that most patterns will quickly converge without generating lots of extra states. Any edge going back to the starting state will converge. This is how state explosion is avoided. There are two characteristics that are labeled here. Whenever the second DFA diverges from the superimposed starting state (there are three states in the signature) the state is marked as being divergent. The final states for the combined DFAs are also marked. It is possible that a final state occurs on the divergent (third) state, so this also has to be marked as associated with that divergent state.

These signals are recursive and can be used to combine any number of DFAs. One embodiment has two lists of events at the top level for any combination, the events that occur with only two states present, and the events that occur in the third state when that state is present. There is a large class of DFAs that combine without needing final state events in the divergent (third) state. Generally it takes unions of closures in the second regular expression to produce events in the divergent (third) state. It may be possible to specifically exclude these cases from optimization to reduce the complexity of the representation of events.

Figure 7:
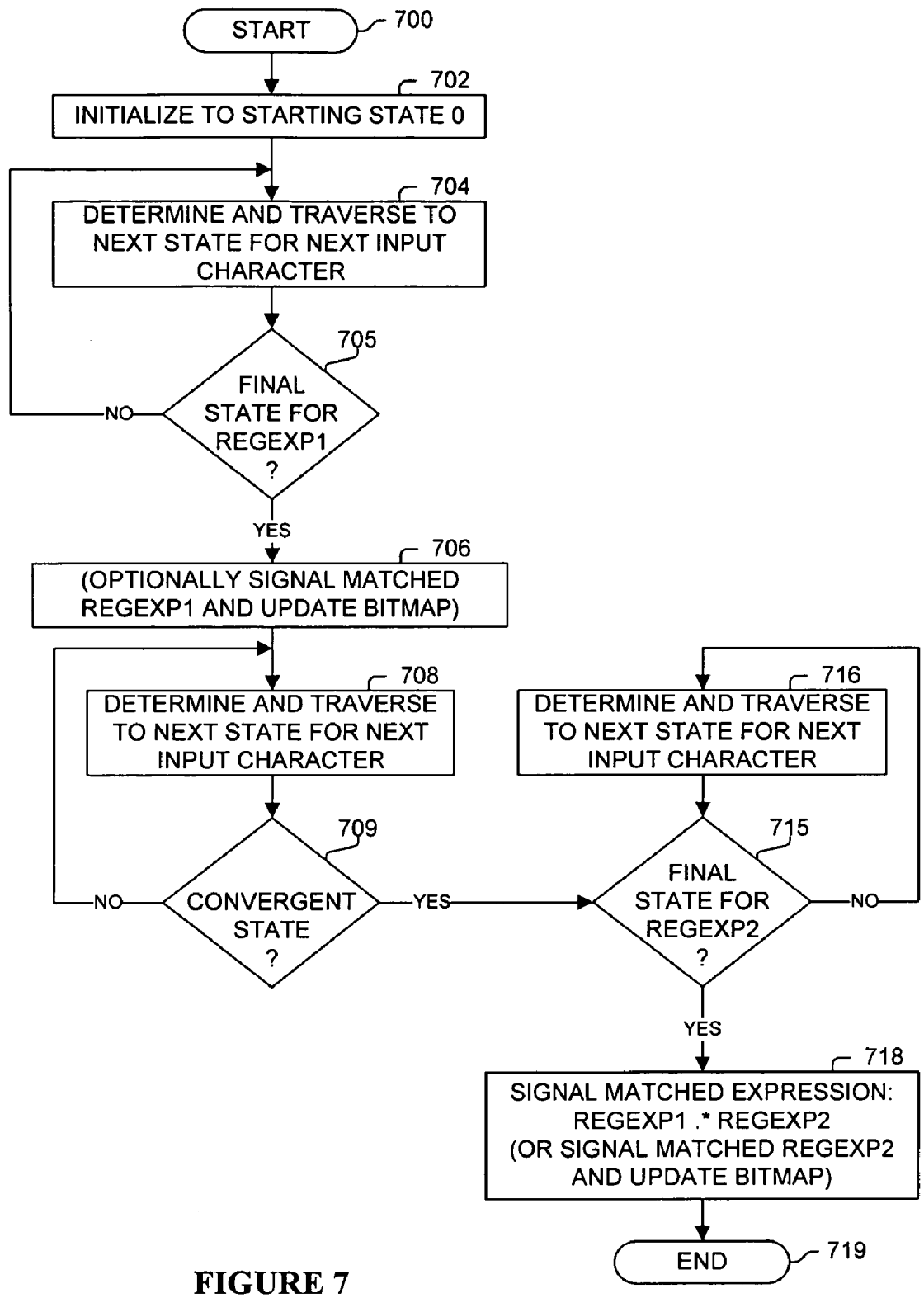
FIG. 7 is a flow diagram illustrating a process used in one embodiment of a matching mechanism.

FIG. 7 is a flow diagram illustrating a process used in one embodiment of a matching mechanism traversing a sequentially merged DFA, such as DFA 640 (FIG. 6D). Processing begins with process block 700, and proceeds to process block 702, wherein the current state is initialized to the starting state of the merged DFA. Until a final state corresponding to the first regular expression is reached for the first-time as determined in process block 705, the merged DFA is traversed to a next state based on a next input character of the series of input characters. In process block 706, the matching of the first regular expression is signaled or otherwise identified, and in one embodiment, a bitmap used in identifying the matching of the series of regular expressions is updated to reflect that the first regular expression has been matched.

Process blocks 708-718 are used to identify the matching of the second regular expression using non-overlapping characters for matching the first regular expression. In process block 708, the merged DFA is traversed for the next input character. As determined in process block 709, if the new state is a convergent state, then processing proceeds to process block 715; otherwise, processing returns to process block 709. As determined in process block 715, until a final state corresponding to the second regular expression, the merged DFA is traversed for the next input character in process block 716. Upon reaching a final state corresponding to the second regular as indicated by process block 718, the series of the first regular expression followed by the second regular expression has been matched and such is signaled, and/or possibly the bitmap is updated to reflect the matching of the second regular expression. Processing is complete as indicated by process block 719.

Figure 8:
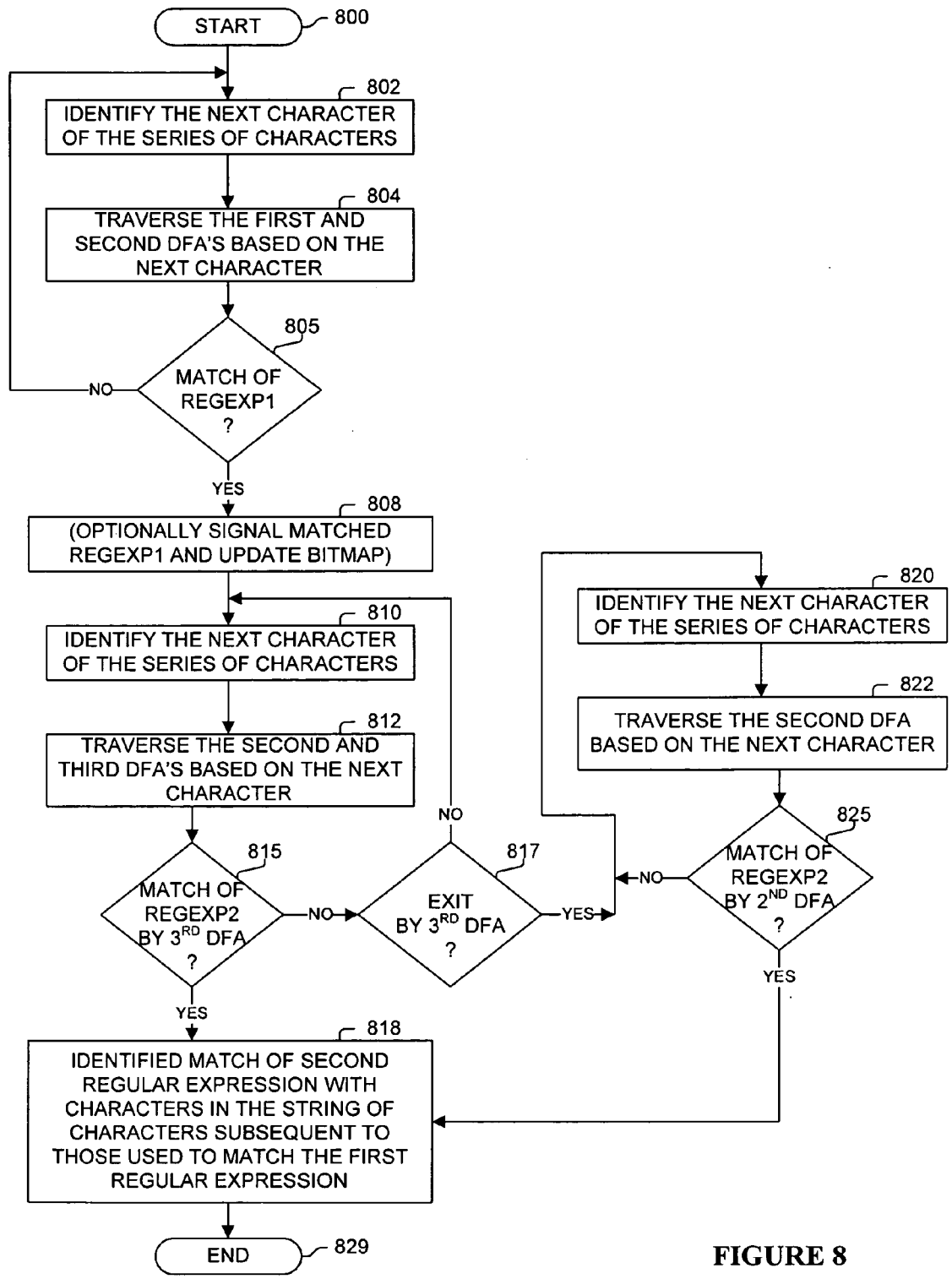
FIG. 8 is a flow diagram illustrating a process used in one embodiment of a matching mechanism.

FIG. 8 is a flow diagram illustrating a process used in one embodiment of a matching mechanism for identifying a matching of the series of regular expressions including the first and second regular expressions represented by first and second DFAs, respectively, and using a third DFA to process characters from the matching of the first regular expression until the third DFA converges back to the second DFA corresponding to the second regular expression. The third DFA will be initiated starting from the beginning of the second regular expression and traversed until it and the second DFA have converged together.

Processing begins with process block 800. Until the first regular expression has been matched s determined in process block 805, a next character in the series of characters is identified in process block 802, and the first and second DFAs are traversed based thereon. In process block 808, the matching of the first regular expression is signaled or otherwise identified, and in one embodiment, a bitmap used in identifying the matching of the series of regular expressions is updated to reflect that the first regular expression has been matched.

Process blocks 810-817 are used to traverse the second and third DFAs based on the next character in the string of character until either the third DFA reaches a final state (as determined in process block 815) corresponding to a matching of the second regular expression and which is indicated by process block 818 that the second regular expression has been matched with characters in the series of characters subsequent to those character used in matching the first regular expression, or until an exit state has been reached (as determined in process block 817) corresponding a convergence with the second DFA, and which case processing proceeds to process block 820. Until there is a match of the second DFA as determined by process block 825, the second DFA is traversed based on a next input character as indicated by process blocks 820-822. Upon matching of the second regular expression as determined in process block 825, processing proceeds to process block 818, which identifies that the second regular expression has been matched with characters in the series of characters subsequent to those character used in matching the first regular expression. Processing is complete as indicated by process block 829.

Figure 9:
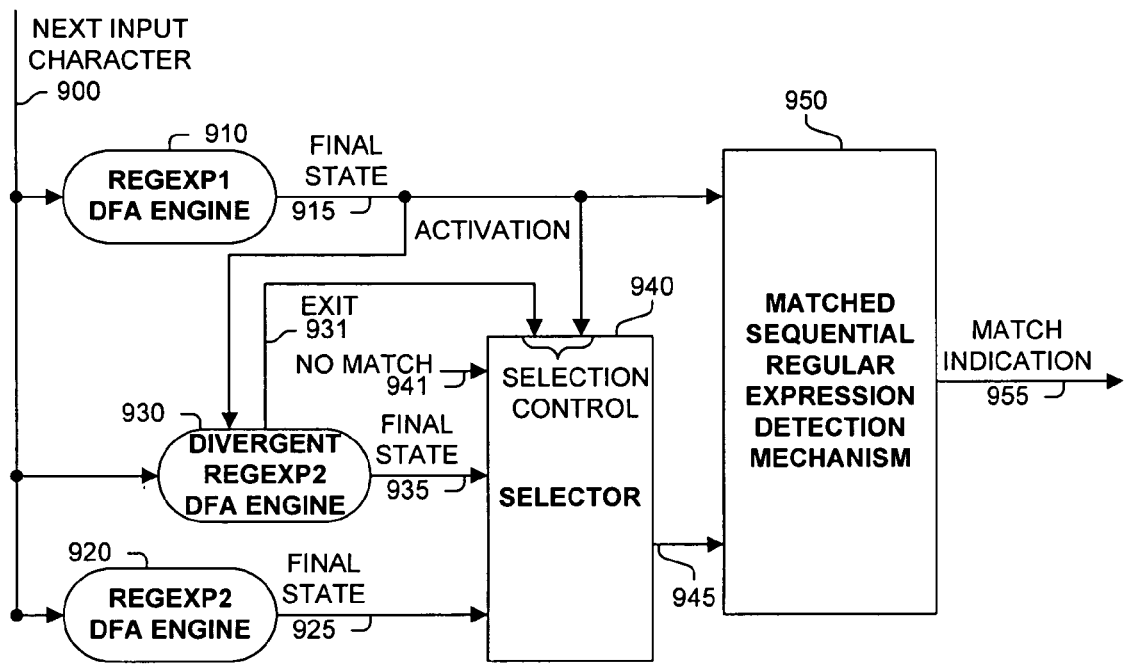
FIG. 9 is a block diagram of a matching mechanism used in one embodiment which is configured for processing each character of a series of input characters in order identify if and when the series of characters matches a series of regular expressions.

FIG. 9 is a block diagram of a matching mechanism used in one embodiment which is configured for processing each character of a series of input characters in order identify if and when the series of characters matches a series of regular expressions, similar to that described in relation to FIG. 8. Shown is a first regular expression DFA engine 910 for identifying a match with the first regular expression, a second DFA regular expression engine 920 for identifying a match with the second regular expression, and a third/divergent portion DFA engine 930 for identifying a match with the second regular expression. DFA engines 910, 920, and 930 are responsive to the next input character of the series/sequence of input characters. Initially, DFA engines 910 and 920 are operating, and selector 940 is selecting no-match signal 941 as the series of regular expressions including the first regular expression followed by the second regular expression has not been matched. When the first regular expression has been matched as determined by first regular expression engine 910, it generates a final state signal 915 which is provided to matched sequential regular expression detection mechanism 945 (which may update a data structure such a bitmap in response). Final state signal 915 also initiates the operation of third/divergent portion DFA engine 930 to operate from its starting state and is responsive to next input characters 900 received subsequent to the matching of the first regular expression. Final state signal 915 also causes selector 940 to select the result of third/divergent portion DFA engine 930. If third/divergent portion DFA engine 930 reaches a final state corresponding to the matching of the second regular expression, than it signals such as final state signal 935, which matched sequential regular expression detection mechanism 945 receives (and which may update a data structure such a bitmap in response) and signals match indication 955 that the series of regular expressions have been matched. Otherwise, if third/divergent portion DFA engine 930 reaches an exit state corresponding to the convergence of its DFA with that of second regular expression DFA engine 920, then it generates exit signal 931 and selector 940 then selects the result of second regular expression DFA engine 920, which stops the masking of any previously generated final state signal 925. When second regular expression DFA engine 920 reaches a final state corresponding to the matching of the second regular expression, it generates final state signal 925 (which it may have already done previously, but were masked by selector 940), which matched sequential regular expression detection mechanism 945 receives (and which may update a data structure such a bitmap in response) and signals match indication 955 that the series of regular expressions have been matched.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for use in traversing a deterministic finite automaton (DFA) for use in identifying matches to a series of regular expressions, the series of
   regular expressions including a first regular expression followed by a second regular expression, the DFA representing the first regular expressions and the second regular expression, the DFA including a plurality of convergent states and a plurality of divergent states, the plurality of divergent states including one or more divergent states forming one or more traversable paths from a particular state, corresponding to a first regular expression final state representing the matching of the first regular expression, to a divergent final state, representing the matching of the second regular expression, the apparatus comprising:
   means for traversing the DFA in response to an input string, the DFA configured to identity individual matching of the first regular expression and the second regular expression, and for masking said identification of matching the second regular expression if a particular state corresponding to the matching of the second regular expression is a divergent final state and the traversal from the state corresponding to the first-time matching of the first regular expression to the particular state includes only divergent states.

2. The apparatus of claim 1, comprising means for creating the DFA, said means for creating the DFA including means for identifying states of the DFA as being convergent and divergent.

3. A method for use in identifying matches to a series of regular expressions, the series of regular expressions including a first regular expression followed by a second regular expression, the method comprising:
   creating, by a particular machine, a first deterministic finite automaton (DFA) for the first regular expression;
   creating, by the particular machine, a second DFA for the second regular expression; and
   merging, by the particular machine, the first DFA and the second DFA to create a merged DFA with a particular state within the merged DFA corresponding to both a starting state of the second DFA and to a final state of the first DFA, the merged DFA including a plurality of convergent states and a plurality of divergent states, the plurality of divergent states including one or more divergent states forming one or more traversable paths from the particular state to a particular final state of the second DFA;
   wherein a distinction between convergent and divergent states provides at least a mechanism for use in identifying whether or not a particular traversal of the merged DFA from the first time reaching the particular state to the particular final state should or should not correspond to a matching of the second regular expression; wherein the particular traversal reaching the particular final state results in a matching of the second regular expression if the particular traversal includes at least one convergent state, else the particular traversal reaching the particular final state does not result in a matching of the second regular expression.

4. The method of claim 3, comprising: traversing the merged DFA to reach the particular final state, and in response, identifying that the series of regular expressions is matched.

5. The method of claim 3, comprising: traversing the merged DFA to reach the particular final state via only divergent states since reaching for the first time the particular state.

6. The method of claim 5, comprising: traversing the merged DFA to reach the particular final state again after having said traversed the merged DFA to reach the particular final state via only divergent states since reaching for the first time the particular state, and in response, identifying that the series of regular expressions is matched.

7. One or more tangible computer-readable media containing computer-executable instructions for performing operations for use in identifying matches to a series of regular expressions, the series of regular expressions including a first regular expression followed by a second regular expression, said operations comprising:
   creating a first deterministic finite automaton (DFA) for the first regular expression;
   creating a second DFA for the second regular expression; and merging the first DFA and the second DFA to create a merged DFA with a particular state within the merged DFA corresponding to both a starting state of the second DFA and to a final state of the first DFA, the merged DFA including a plurality of convergent states and a plurality of divergent states, the plurality of divergent states including one or more divergent states forming one or more traversable paths from the particular state to a particular final state of the second DFA;
   wherein a distinction between convergent and divergent states provides at least a mechanism for use in identifying whether or not a particular traversal of the merged DFA from the first time reaching the particular state to the particular final state should or should not correspond to a matching of the second regular expression; wherein the particular traversal reaching the particular final state results in a matching of the second regular expression if the particular traversal includes at least one convergent state, else the particular traversal reaching the particular final state does not result in a matching of the second regular expression.

8. The computer-readable media of claim 7, wherein said operations comprise: traversing the merged DFA to reach the particular final state, and in response, identifying that the series of regular expressions is matched.

9. The computer-readable media of claim 7, wherein said operations comprise: traversing the merged DFA to reach the particular final state via only divergent states since reaching for the first time the particular state.

10. The computer-readable media of claim 9, wherein said operations comprise: traversing the merged DFA to reach the particular final state again after having said traversed the merged DFA to reach the particular final state via only divergent states since reaching for the first time the particular state, and in response, identifying that the series of regular expressions is matched.

11. A method, performed by a particular machine for use in identifying matches to a series of regular expressions, the series of regular expressions including a first regular expression followed by a second regular expression, the method comprising:
    traversing, by the particular machine, a first deterministic finite automaton (DFA) corresponding to the first regular expression based on a series of characters for identifying a match between the first regular expression and the series of characters;
    traversing, by the particular machine, a second DFA corresponding to the second regular expression based on the series of characters for identifying one or more matches between the second regular expression and the series of characters;
    traversing, by the particular machine, a third DFA corresponding to a divergent portion of the second regular expression based on characters in the string of characters subsequent to the first-time match of the first regular expression for identifying a match between the second regular expression and the string of characters subsequent to the first-time match of the first regular expression; and
    wherein the matching of the second regular expression for identifying whether the series of regular expression is matched determined by the third DFA identifying the match between the second regular expression and the string of characters subsequent to the first-time match of the first regular expression or if the third DFA is no longer relevant for identifying the matching of the second regular expression, in response to the second DFA identifying a match between the second regular expression and the series of characters.

12. The method of claim 11, wherein a bitmap representing an ordered matching of the first and second regular expression is updated in response to the first DFA first-time identifying the match between the first regular expression and the series of characters; and for characters of the string of characters subsequent to said first-time identification of the matching between the first regular expression and the series of characters, the bitmap representing the ordered matching of the first and second regular expression is updated in response to the third DFA identifying the match between the second regular expression and the string of characters subsequent to the first-time match of the first regular expression or if the third DFA is no longer relevant for identifying the matching of the second regular expression, in response to the second DFA identifying a match between the second regular expression and the series of characters.

13. The method of claim 11, including masking, by the particular machine, said identification of a first-time matching between the second regular expression and the series of characters by the second DFA such that the second regular expression is not considered matched.

14. The method of claim 11, wherein the first DFA and the second DFA are merged into a merged first and second DFA, and said traversing the first and second DFAs includes traversing the merged first and second DFA.

15. One or more tangible computer-readable media containing computer-executable instructions for performing operations for use in identifying matches to a series of regular expressions, the series of regular expressions including a first regular expression followed by a second regular expression, said operations comprising:
    traversing a first deterministic finite automaton (DFA) corresponding to the first regular expression based on a series of characters for identifying a match between the first regular expression and the series of characters;
    traversing a second DFA corresponding to the second regular expression based on the series of characters for identifying one or more matches between the second regular expression and the series of characters;
    traversing a third DFA corresponding to a divergent portion of the second regular expression based on characters in the string of characters subsequent to the first-time match of the first regular expression for identifying a match between the second regular expression and the string of characters subsequent to the first-time match of the first regular expression; and
    wherein the matching of the second regular expression for identifying whether the series of regular expression is matched determined by the third DFA identifying the match between the second regular expression and the string of characters subsequent to the first-time match of the first regular expression or if the third DFA is no longer relevant for identifying the matching of the second regular expression, in response to the second DFA identifying a match between the second regular expression and the series of characters.

16. The computer-readable media of claim 15, wherein said operations comprise: masking said identification of a first-time matching between the second regular expression and the series of characters by the second DFA such that the second regular expression is not considered matched.

17. The computer-readable media of claim 15, the first DFA and the second DFA are merged into a merged first and second DFA, and said traversing the first and second DFAs includes traversing the merged first and second DFA.

18. An apparatus for use in identifying matches to a series of regular expressions, the series of regular expressions including a first regular expression followed by a second regular expression, the apparatus comprising:
    means for traversing a first deterministic finite automaton (DFA) corresponding to the first regular expression based on a series of characters for identifying a match between the first regular expression and the series of characters;
    means for traversing a second DFA corresponding to the second regular expression based on the series of characters for identifying one or more matches between the second regular expression and the series of characters;

means for traversing a third DFA corresponding to a divergent portion of the second regular expression based on characters in the string of characters subsequent to the first-time match of the first regular expression for identifying a match between the second regular expression and the string of characters subsequent to the first-time match of the first regular expression; and wherein the matching of the second regular expression for identifying whether the series of regular expression is matched determined by the third DFA identifying the match between the second regular expression and the string of characters subsequent to the first-time match of the first regular expression or if the third DFA is no longer relevant for identifying the matching of the second regular expression, in response to the second DFA identifying a match between the second regular expression and the series of characters.

19. The apparatus of claim 18, including means for masking said identification of a first-time matching between the second regular expression and the series of characters by the second DFA such that the second regular expression is not considered matched.

20. The apparatus of claim 18, wherein the first DFA and the second DFA are merged into a merged first and second DFA, and wherein the apparatus includes means for traversing the merged first and second DFA, said means for traversing the merged first and second DFA including means for traversing the first DFA and means for traversing the second DFA.

* * * * *

UNITED STATES PATENT AND TRADEMARK OFFICE
CERTIFICATE OF CORRECTION

PATENT NO. : 7,689,530 B1
APPLICATION NO. : 11/144476
DATED : March 30, 2010
INVENTOR(S) : Williams, Jr. et al.

It is certified that error appears in the above-identified patent and that said Letters Patent is hereby corrected as shown below:

Col. 21, line 59, Claim 1, replace "identity" with -- identify --

Signed and Sealed this

Fifteenth Day of June, 2010

David J. Kappos
*Director of the United States Patent and Trademark Office*